(12) United States Patent
Miyamori et al.

(10) Patent No.: US 11,968,333 B2
(45) Date of Patent: Apr. 23, 2024

(54) IMAGE FORMING APPARATUS

(71) Applicant: FUJIFILM Business Innovation Corp., Tokyo (JP)

(72) Inventors: Shinya Miyamori, Kanagawa (JP); Yuki Tanaka, Kanagawa (JP); Shinsuke Sugi, Kanagawa (JP); Junichiro Mori, Kanagawa (JP); Masashi Morimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 5 days.

(21) Appl. No.: 17/952,650

(22) Filed: Sep. 26, 2022

(65) Prior Publication Data

US 2023/0308550 A1  Sep. 28, 2023

(30) Foreign Application Priority Data

Mar. 28, 2022  (JP) .................. 2022-052641

(51) Int. Cl.
*H04N 1/00* (2006.01)
*G06F 3/12* (2006.01)
*G06K 15/02* (2006.01)

(52) U.S. Cl.
CPC ..... *H04N 1/00029* (2013.01); *H04N 1/00334* (2013.01)

(58) Field of Classification Search
None
See application file for complete search history.

(56) References Cited

U.S. PATENT DOCUMENTS

| 9,282,199 | B2 | 3/2016 | Hashizume | |
|---|---|---|---|---|
| 2005/0007404 | A1* | 1/2005 | Usui | B41J 29/38 347/17 |
| 2015/0170008 | A1* | 6/2015 | Hashizume | H04N 1/00045 358/1.15 |
| 2019/0281171 | A1* | 9/2019 | Hayashi | H04N 1/00045 |

FOREIGN PATENT DOCUMENTS

| JP | 2009172966 | * | 8/2009 | B41J 2/01 |
|---|---|---|---|---|
| JP | 2015-118285 A | | 6/2015 | |
| JP | 2017-9837 A | | 1/2017 | |
| JP | 2020069739 | * | 5/2020 | H04N 1/00 |
| JP | 2020-198493 A | | 12/2020 | |

* cited by examiner

*Primary Examiner* — Beniyam Menberu
(74) *Attorney, Agent, or Firm* — Oliff PLC

(57) ABSTRACT

An image forming apparatus that forms an image on a recording medium includes: an image former that forms an image on a recording medium and is capable of forming an image for diagnosis, which is an image used for diagnosis of the image forming apparatus; an image reader that reads the image for diagnosis formed on a recording medium; and a processor configured to change at least one of a reading condition under which the image reader reads the image for diagnosis and a processing condition under which a read image obtained by the reading is processed in accordance with a mode of diagnosis of the image forming apparatus.

9 Claims, 16 Drawing Sheets

FIG. 4

| | CHART TYPE | FOR ROUTINE ADJUSTMENT | FOR ROUTINE DIAGNOSIS |
|---|---|---|---|
| CHART IMAGE CP | FOR GRADATION ADJUSTMENT (CHART PAPER EXCLUSIVE FOR ADJUSTMENT) | USED | NOT USED |
| CHART IMAGE CP | FOR UNEVENNESS ADJUSTMENT/ STREAK DIAGNOSIS NO. 1 (CHART PAPER FOR BOTH ADJUSTMENT AND DIAGNOSIS) | USED | USED |
| CHART IMAGE CP | FOR UNEVENNESS ADJUSTMENT/ STREAK DIAGNOSIS NO. 2 (CHART PAPER FOR BOTH ADJUSTMENT AND DIAGNOSIS) | USED | USED |
| CHART IMAGE CP | FOR BANDING/DENSITY DIAGNOSIS (CHART PAPER EXCLUSIVE FOR DIAGNOSIS) | NOT USED | USED |

FIG. 6

| Chart Information for Transmission | | State of Transmitting Machine | | | | |
|---|---|---|---|---|---|---|
| | | Security Code | | Transmission Control | | |
| | | | | Routine Diagnosis Mode | | Failure Diagnosis Mode |
| Security Code | Transmission Level | Match | Not Match | Time Difference: Less than 10 minutes | Time Difference: 10 minutes or more | |
| 2 | | ○ | × | – | – | – |
| 1 | | – | – | ○ | ○ | ○ |
| 0 | (6A) | – | – | × | ○ | ○ |
| | | – | – | × | × | ○ |

○: TRANSMITTED   ×: NOT TRANSMITTED

FIG. 9

| CHART INFORMATION FOR TRANSMISSION | | | STATE OF TRANSMITTING MACHINE | | | | MACHINE INFORMATION | |
|---|---|---|---|---|---|---|---|---|
| | | | MODEL INFORMATION | | SECURITY CODE | | MATCH | DEGREE OF APPROXIMATION |
| MODEL INFORMATION | SECURITY CODE | TRANSMISSION LEVEL | MATCH | NOT MATCH | MATCH | NOT MATCH | | 2 (CLOSE) | 1 (FAR) |
| | | 0 | ○ | DEPENDING ON CONDITION | – | – | – | – | – |
| | | 1 | – | – | ○ | × | – | – | – |
| | | 2 | – | – | – | – | ○ | ○ | ○ |
| | | | – | – | – | – | ○ | ○ (9A) | × |
| | | | – | – | – | – | ○ (9G) | × | × |

9C (groups the DEGREE OF APPROXIMATION rows including ○ (9A))
9X (dashed group including ○ (9G))

○: TRANSMITTED   ×: NOT TRANSMITTED

FIG. 10
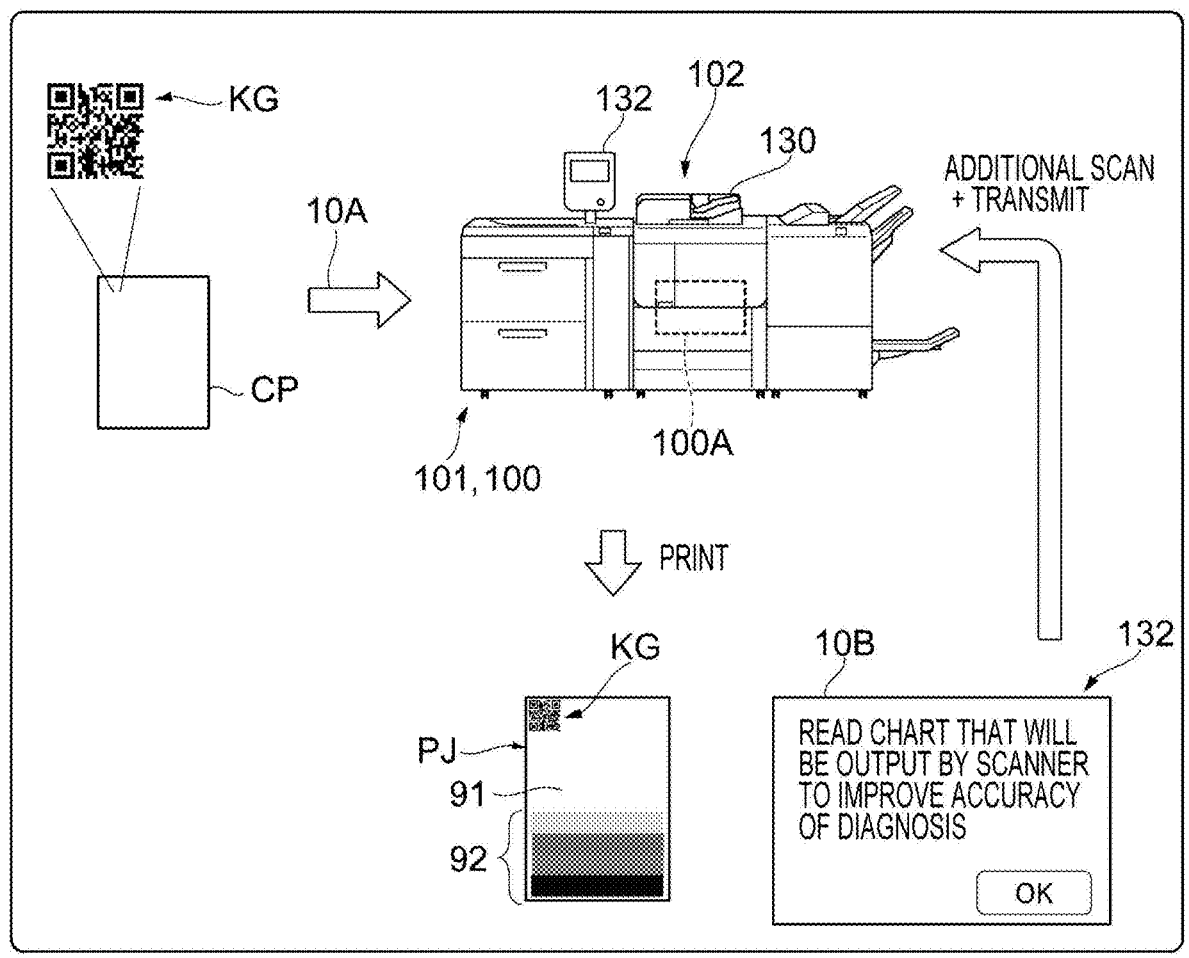
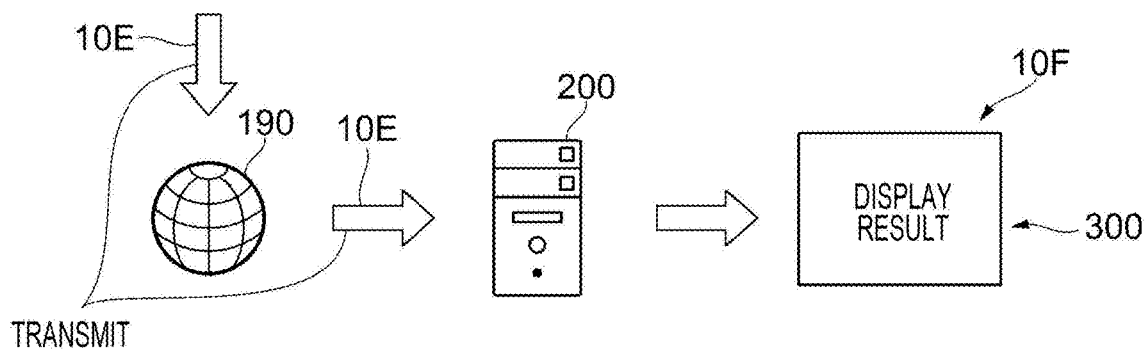

FIG. 12

| TYPE OF DEFECT | MAINTENANCE TARGET | POSITION OF OCCURRENCE | SEVERITY LEVEL |
|---|---|---|---|
| COLOR STREAK | FIRST IMAGE FORMING APPARATUS | 150 mm | 4 |
| COLOR STREAK | SECOND IMAGE FORMING APPARATUS | 292 mm | 1 |

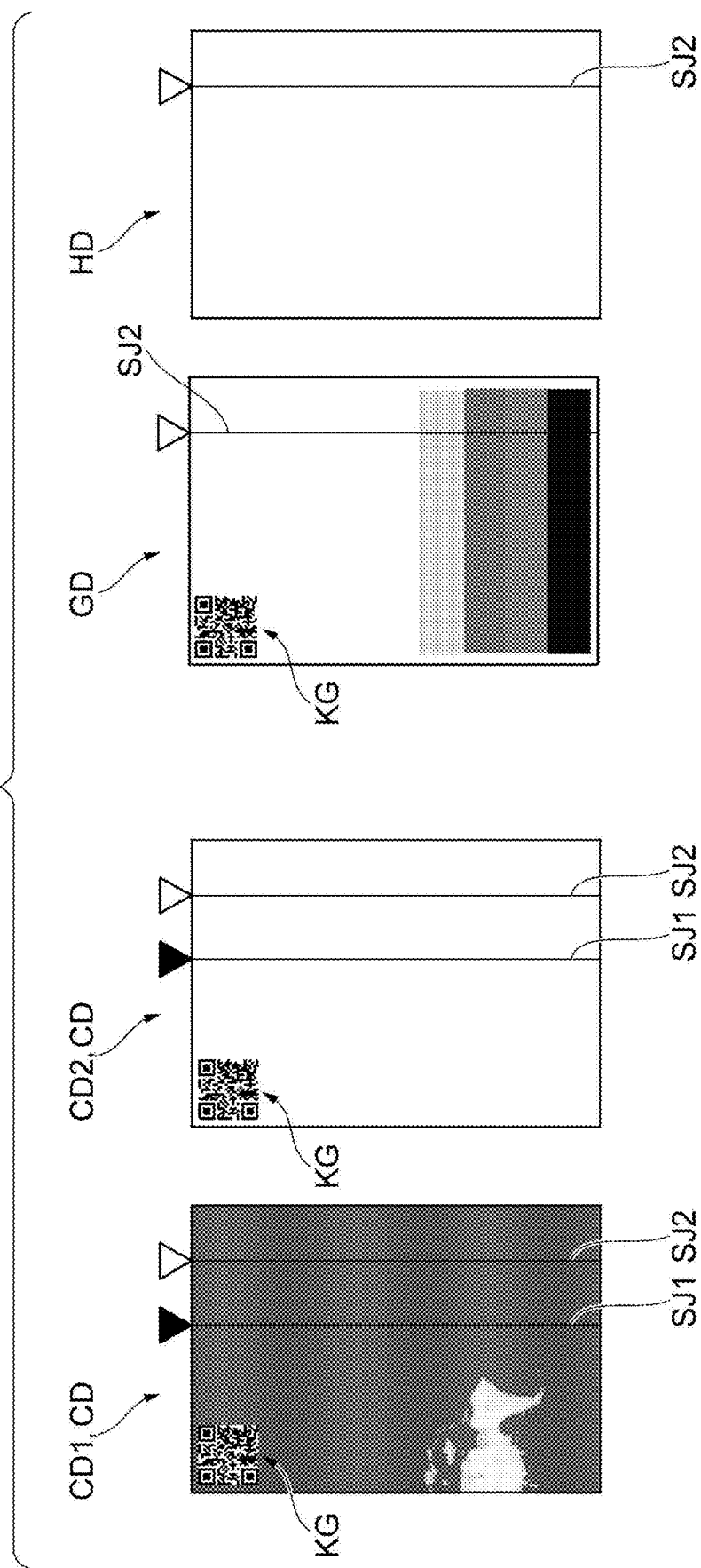

FIG. 16

| | COLOR STREAK | | | | COLOR STREAK | | | | WHITE STREAK | | | | WHITE STREAK | | | |
|---|---|---|---|---|---|---|---|---|---|---|---|---|---|---|---|---|
| CHART IMAGE DATA CD | PRESENT | | | | ABSENT | | | | PRESENT | | | | ABSENT | | | |
| IMAGE FORMATION SURFACE DATA GD | PRESENT | | ABSENT | | PRESENT | | ABSENT | | PRESENT | | ABSENT | | PRESENT | | ABSENT | |
| BLANK SURFACE DATA HD | PRESENT | ABSENT | PRESENT | ABSENT | PRESENT | ABSENT | PRESENT | ABSENT | PRESENT | ABSENT | PRESENT | ABSENT | PRESENT | ABSENT | PRESENT | ABSENT |
| CAUSE: IMAGE FORMING UNIT OF FIRST IMAGE FORMING APPARATUS | ✓ | ✓ | | | | | | | ✓ | ✓ | | | | | | |
| CAUSE: IMAGE FORMING UNIT OF SECOND IMAGE FORMING APPARATUS | | | | | ✓ | | | | | | ✓ | | | ✓ | | |
| CAUSE: IMAGE READING DEVICE OF SECOND IMAGE FORMING APPARATUS | ✓ | | ✓ | | ✓ | | ✓ | | ✓ | | ✓ | | ✓ | | ✓ | |
| CASE | A | B | C | D | E | F | G | H | I | J | K | L | M | N | O | P |

IMAGE FORMING APPARATUS

CROSS-REFERENCE TO RELATED APPLICATIONS

This application is based on and claims priority under 35 USC 119 from Japanese Patent Application No. 2022-052641 filed Mar. 28, 2022.

BACKGROUND

(i) Technical Field

The present disclosure relates to an image forming apparatus.

(ii) Related Art

Japanese Unexamined Patent Application Publication No. 2017-9837 discloses processing in which an operation unit receives selection input of selecting a function of an image forming apparatus for which an output image evaluation is to be conducted and a controller controls output of a test pattern by an image output unit on the basis of the selection input.

Japanese Unexamined Patent Application Publication No. 2020-198493 discloses an image forming apparatus that transmits image data of a printed material to a server apparatus to diagnose a trouble.

Japanese Unexamined Patent Application Publication No. 2015-118285 discloses processing of deciding, for each analysis method, settings that minimize an image data size while satisfying image quality necessary for image analysis and transmitting a scan image to an image analysis server after editing the scan image.

SUMMARY

To diagnose an image forming apparatus, for example, an image for diagnosis is read under a predetermined reading condition, and for example, a read image obtained by this reading is processed under a predetermined processing condition.

If the reading condition and the processing condition cannot be changed, a situation where the reading condition and the processing condition are not suitable for a status at a time of diagnosis of the image forming apparatus can occur.

Aspects of non-limiting embodiments of the present disclosure relate to a technique of making it possible to change a reading condition under which an image forming apparatus reads an image for diagnosis and a processing condition under which a read image obtained by reading the image for diagnosis is processed in accordance with a status at a time of diagnosis of the image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus that forms an image on a recording medium, including: an image former that forms an image on a recording medium and is capable of forming an image for diagnosis, which is an image used for diagnosis of the image forming apparatus; an image reader that reads the image for diagnosis formed on a recording medium; and a processor configured to change at least one of a reading condition under which the image reader reads the image for diagnosis and a processing condition under which a read image obtained by the reading is processed in accordance with a mode of diagnosis of the image forming apparatus.

BRIEF DESCRIPTION OF THE DRAWINGS

An exemplary embodiment of the present disclosure will be described in detail based on the following figures, wherein:

FIG. 4 is a view for explaining chart paper;

FIG. 6 illustrates a reference table referred to by the image forming apparatus;

FIG. 9 illustrates a relationship between a transmission level and permission/non-permission of transmission;

FIG. 10 is a view for explaining details of processing performed when chart paper is read by a second image forming apparatus;

FIG. 12 illustrates another example of the display screen;

FIG. 14 illustrates a specific example of chart image data, image formation surface data, and blank surface data;

FIG. 16 illustrates a relationship between a streak that occurs and a cause.

DETAILED DESCRIPTION

Exemplary embodiments of the present disclosure will be described in detail below with reference to the drawings.

Figure 1:
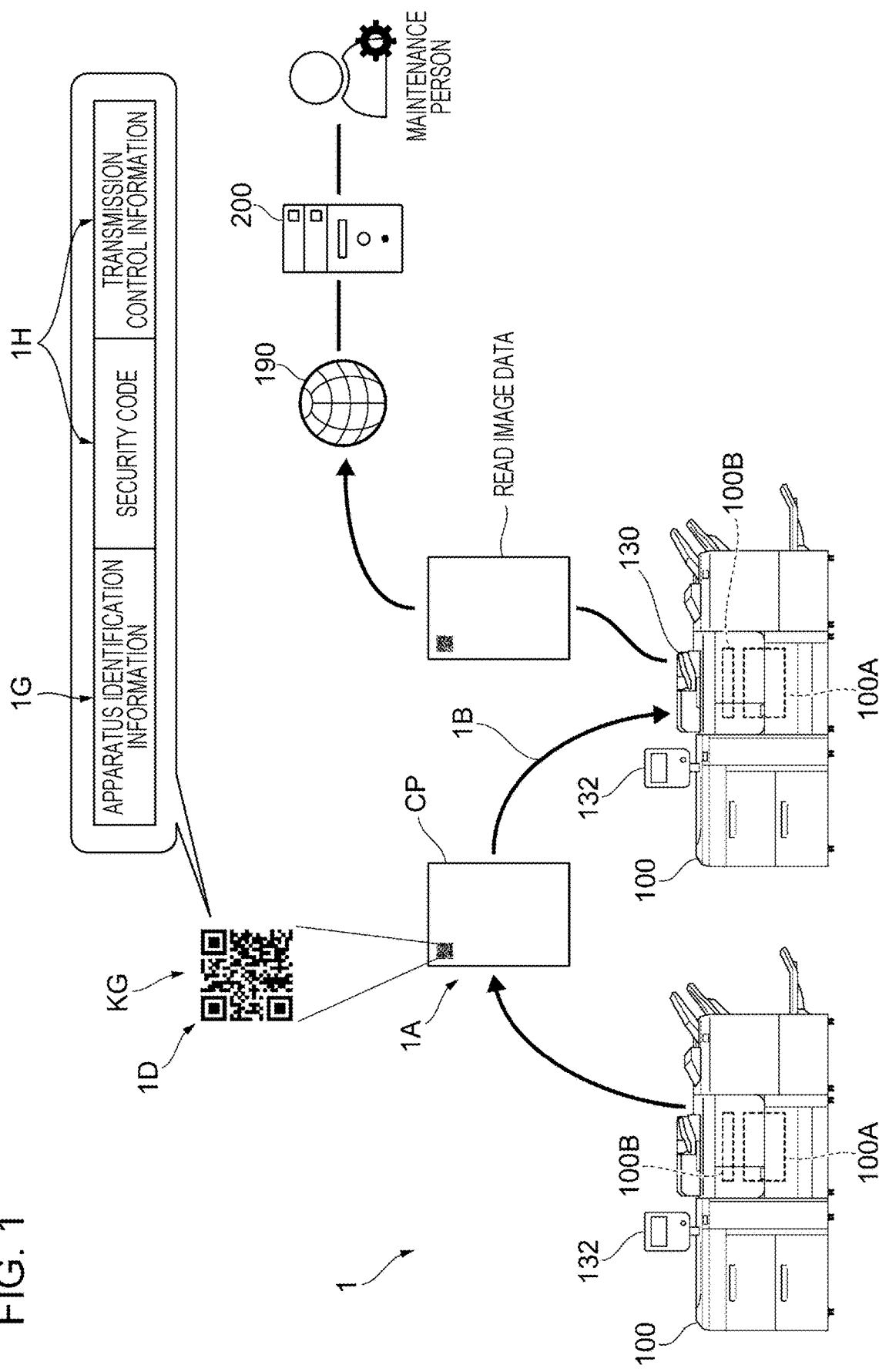
FIG. 1 illustrates an example of an information processing system.

FIG. 1 illustrates an example of an information processing system 1.

In the information processing system 1 according to the present exemplary embodiment, plural image forming apparatuses 100 and a server apparatus 200 connected to the plural image forming apparatuses 100 over a communication line 190 are provided. In FIG. 1, one of the plural image forming apparatuses 100 is illustrated.

Each of the image forming apparatuses 100 includes an image forming unit 100A as an example of an image former that forms an image on paper, which is an example of a recording medium.

The image forming unit 100A forms an image on paper, for example, by an inkjet system or an electrophotographic system. Note that the image forming unit 100A may form an image on paper by a system other than the inkjet system and the electrophotographic system.

In the present exemplary embodiment, processing for adjusting the image forming unit 100A is performed in the image forming apparatus 100. Furthermore, in the present exemplary embodiment, diagnosis of the image forming apparatus 100 is made in the server apparatus 200, which is an example of an information processing apparatus.

The image forming apparatus 100 has an information processing unit 100B, and the information processing unit 100B performs various kinds of processing described below on the image forming apparatus 100.

Figure 2:
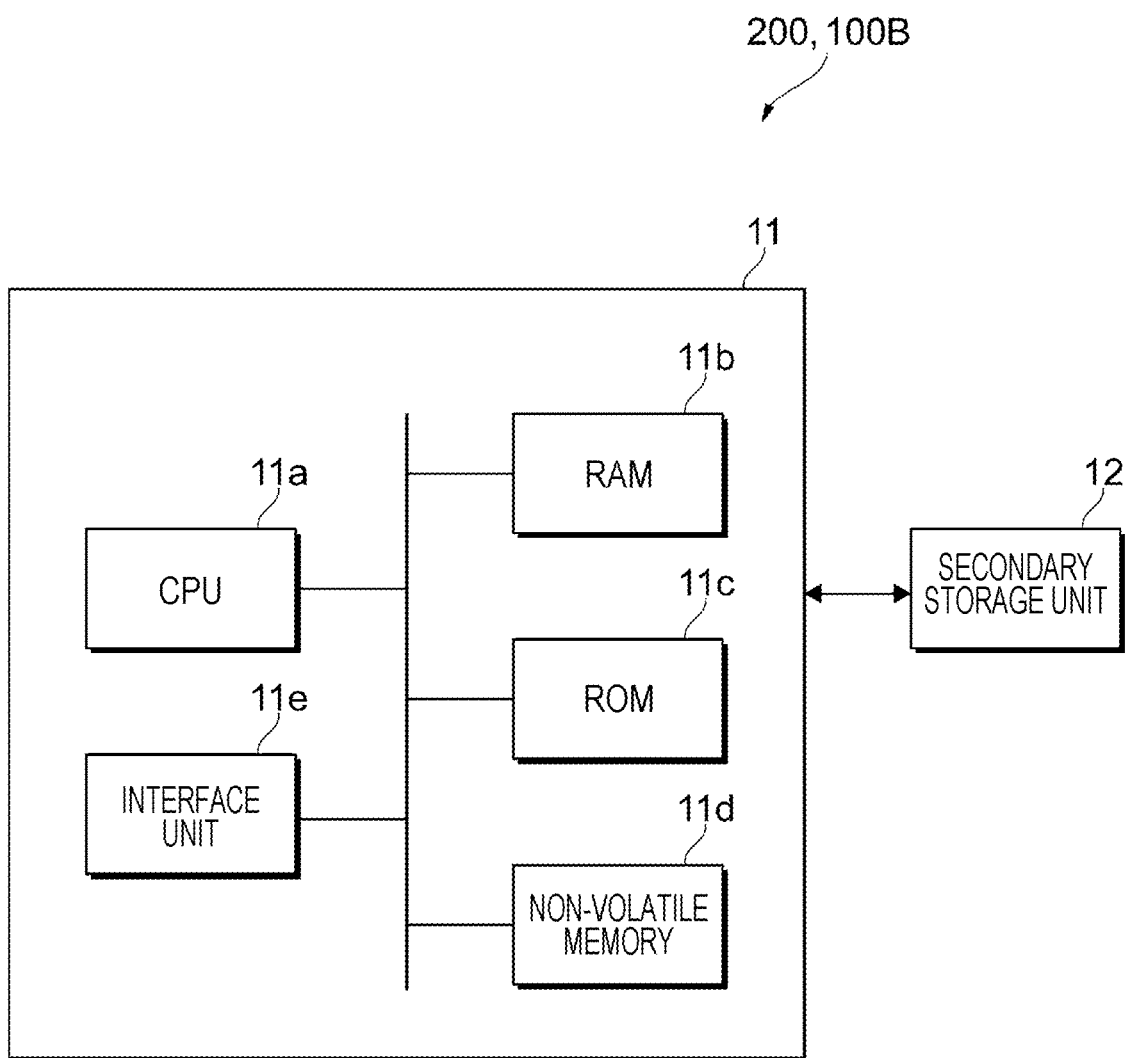
FIG. 2 illustrates an example of a hardware configuration of an information processing unit provided in a server apparatus and an image forming apparatus.

FIG. 2 illustrates an example of a hardware configuration of the server apparatus 200 and the information processing unit 100B provided in the image forming apparatus 100. The server apparatus 200 and the information processing unit 100B provided in the image forming apparatus 100 are each realized by a computer.

The server apparatus 200 and the information processing unit 100B each have an arithmetic processing unit 11 that performs digital arithmetic processing in accordance with a program and a secondary storage unit 12 in which a file and the like are stored.

The secondary storage unit 12 is, for example, realized by an existing information storage device such as a hard disk drive (HDD), a semiconductor memory, or a magnetic tape.

The arithmetic processing unit 11 includes a CPU 11a, which is an example of a processor.

Furthermore, the arithmetic processing unit 11 includes a RAM 11b used as a working memory or the like of the CPU 11a and a ROM 11c in which a program executed by the CPU 11a and the like are stored.

Furthermore, the arithmetic processing unit 11 includes a non-volatile memory 11d that is rewritable and can hold data even when power supply is cut off and an interface unit 11e that controls units such as a communication unit connected to the arithmetic processing unit 11.

The non-volatile memory 11d is, for example, an SRAM backed up by a battery, a flash memory, or the like. In the secondary storage unit 12, a program executed by the arithmetic processing unit 11 is stored in addition to a file and the like.

In the present exemplary embodiment, the arithmetic processing unit 11 reads a program stored, for example, in the secondary storage unit 12, and thereby processing is performed.

The program executed by the CPU 11a may be offered to the server apparatus 200 and the information processing unit 100B while being stored in a computer-readable recording medium such as a magnetic recording medium (e.g., a magnetic tape, a magnetic disc), an optical recording medium (e.g., an optical disc), a magnetooptical medium, or a semiconductor memory. Alternatively, the program executed by the CPU 11a may be offered to the server apparatus 200 and the information processing unit 100B by using means of communication such as the Internet.

In the specification, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in the embodiments above, and may be changed.

Among processing described below, processing performed by the image forming apparatus 100 is performed by the CPU 11a, which is an example of a processor provided in the image forming apparatus 100.

Among processing described below, processing performed by the server apparatus 200 is performed by the CPU 11a, which is an example of a processor provided in the server apparatus 200.

Figure 3:
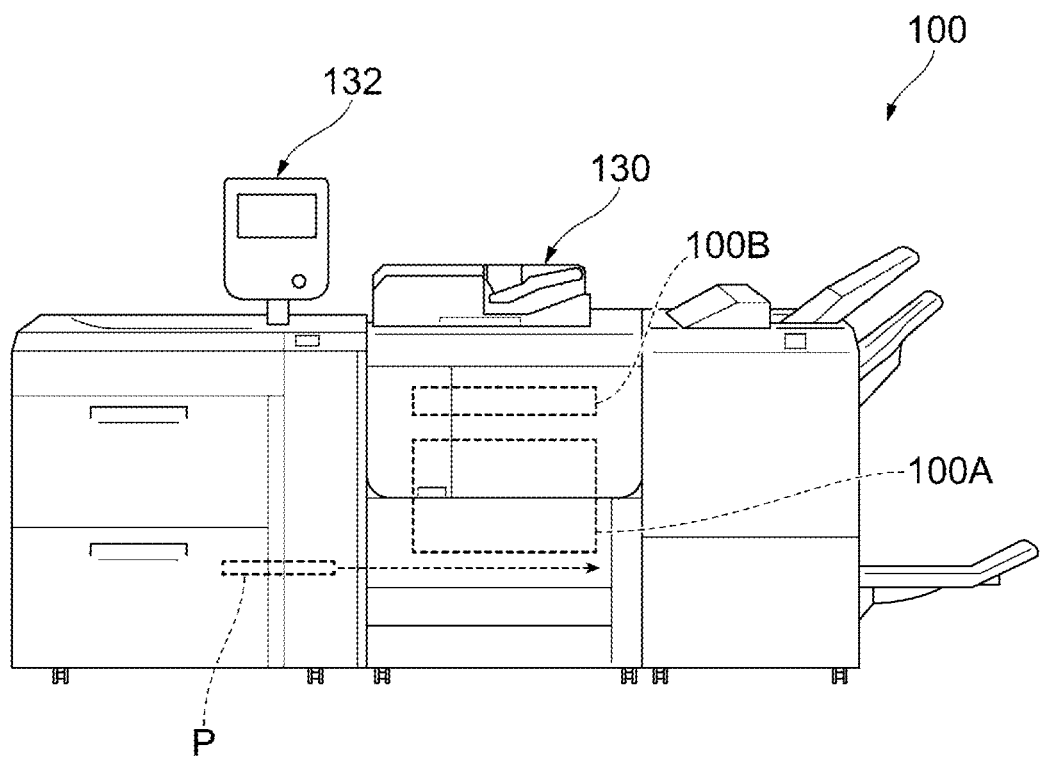
FIG. 3 is a view for explaining the image forming apparatus.

FIG. 3 is a view for explaining the image forming apparatus 100.

In the present exemplary embodiment, the image forming apparatus 100 includes the image forming unit 100A that forms an image on paper P, which is an example of a recording medium, as described above.

In the present exemplary embodiment, when the paper P passes the image forming unit 100A, one surface of the paper P is facing the image forming unit 100A.

In this state, the other surface of the paper P is facing a side opposite to the image forming unit 100A, and the other surface is not influenced by the image forming unit 100A.

In the present exemplary embodiment, even if a trouble occurs in the image forming unit 100A, ink or toner is not attached to the other surface.

Furthermore, the image forming apparatus 100 includes an image reading device 130, which is an example of an image reader that reads an image on a recording medium such as paper P.

The image reading device 130 is a scanner that has a function of transporting the paper P. The image reading device 130 includes a light source that emits light with which the paper P is to be irradiated and a light receiving unit such as a Charge Coupled Device (CCD) that receives light reflected by the paper P. In the present exemplary embodiment, read image data, which will be described later, is generated on the basis of the reflected light received by the light receiving unit.

An image reading position is set in advance in the image reading device 130, and the image reading device 130 reads an image of a part of paper P located at this image reading position among sheets of paper P that are sequentially transported.

In the example illustrated in FIG. 3, the image reading device 130 is provided on an upper part of the image forming apparatus 100. The image reading device 130 sequentially reads sheets of paper P placed by a user.

Note that a way in which the image reading device 130 is installed is not limited to this, and the image reading device 130 may be provided inside the image forming apparatus 100 on a transport path for sheets of paper P.

In this case, sheets of paper P on which images have been formed by the image forming unit 100A sequentially pass the image reading device 130, and the images on the sheets of paper P are sequentially read when the sheets of paper P pass the image reading device 130.

Furthermore, in the present exemplary embodiment, a mechanism for reversing paper P is provided in the image reading device 130, and thereby paper P that has been reversed can be supplied to the image reading position.

With this configuration, in the present exemplary embodiment, paper P whose image on one surface has been read can be supplied to the image reading position again after being reversed. In this way, an image on a front surface and an image on a back surface of the paper P can be read.

Furthermore, each of the image forming apparatuses 100 includes an operation receiving unit 132 that receives a user's operation. The operation receiving unit 132 is a touch panel. The operation receiving unit 132 displays information for the user and receives a user's operation.

Note that an operation receiving unit and an information display unit may be separately provided instead of the configuration in which the single operation receiving unit 132 displays information for the user and receives a user's operation as in the present exemplary embodiment.

Each of the image forming apparatuses 100 has an adjustment function of adjusting the image forming unit 100A. Furthermore, each of the image forming apparatuses 100 has an information transmission function of transmitting information to the server apparatus 200.

In the present exemplary embodiment, in a case where the image forming unit 100A is adjusted, a chart image is formed on paper P by causing the image forming unit 100A to operate.

In this way, chart paper CP, which is paper P on which a chart image (an example of an image for diagnosis; not illustrated in FIG. 1) is formed, is generated, as indicated by reference sign 1A in FIG. 1.

The chart image is an image used for adjustment and diagnosis of the image forming unit 100A. In the present exemplary embodiment, chart paper CP, which is paper P on which the chart image used for the adjustment and diagnosis is formed, is generated.

When the chart paper CP is generated, the chart image on the chart paper CP is read by using the image reading device 130, as indicated by the reference sign 1B in FIG. 1.

In this way, read image data obtained by reading the chart paper CP is generated.

Then, the image forming apparatus 100 adjusts the image forming unit 100A by using the read image data. Specifically, the image forming apparatus 100 adjusts the image forming unit 100A by analyzing the read image data.

In other words, the image forming apparatus 100 adjusts the image forming unit 100A on the basis of a reading result obtained by reading the chart image by the image reading device 130.

Specifically, the image forming apparatus 100 changes a setting value concerning the image forming unit 100A as needed on the basis of a result of the analysis of the read image data. In other words, the image forming apparatus 100 sets a new setting value as a setting value concerning image formation as needed on the basis of a result of the analysis of the read image data.

In this way, the image forming apparatus 100 adjusts the image forming unit 100A, and thereby quality of an image to be formed is improved.

Furthermore, in the present exemplary embodiment, the read image data obtained when the image forming unit 100A is adjusted is transmitted to the server apparatus 200 and is then stored in the server apparatus 200.

The server apparatus 200 diagnoses the image forming apparatus 100 on the basis of the read image data.

Furthermore, a maintenance person who does maintenance of the image forming apparatus 100 accesses the server apparatus 200 and diagnoses the image forming apparatus 100 by referring to the read image data stored in the server apparatus 200 and a result of diagnosis made by the server apparatus 200.

As described above, in each of the image forming apparatuses 100, the image forming unit 100A is adjusted by generating chart paper CP and reading the chart paper CP.

More specifically, in each of the image forming apparatuses 100, the image forming unit 100A is adjusted by generating chart paper CP and reading the chart paper CP every predetermined specific period, for example, every day.

Hereinafter, this adjustment of the image forming apparatus 100 routinely performed is referred to as "routine adjustment".

Furthermore, in the present exemplary embodiment, when the routine adjustment is performed, read image data is transmitted to the server apparatus 200. Then, in the present exemplary embodiment, the server apparatus 200 or the maintenance person diagnoses the image forming apparatus 100, as described above.

Hereinafter, the diagnosis of the image forming apparatus 100 made when the routine adjustment is performed is referred to as "routine diagnosis".

In the present exemplary embodiment, a reading result of a chart image formed on paper P by the image forming unit 100A when the routine adjustment is performed is output to the server apparatus 200, which is an example of an external apparatus. Then, the server apparatus 200 or the maintenance person diagnoses the image forming apparatus 100.

In the present exemplary embodiment, when chart paper CP is read for the routine adjustment, read image data obtained by the reading is used not only for the routine adjustment, but also for the routine diagnosis.

In this way, in the present exemplary embodiment, the routine diagnosis is performed without user's awareness. In other words, in the present exemplary embodiment, the routine diagnosis is actually also performed in addition to the routine adjustment even if the user thinks he or she is performing work for the routine adjustment.

When read image data is transmitted to the server apparatus 200, only part of the read image data necessary for the routine diagnosis may be transmitted instead of transmitting all the read image data.

In other words, only read image data of chart paper CP necessary for the routine diagnosis may be transmitted to the server apparatus 200 instead of transmitting read image data of all chart paper CP generated by the image forming apparatus 100 to the server apparatus 200.

In the present exemplary embodiment, there are chart paper CP used only for the routine adjustment (hereinafter referred to as "chart paper CP exclusive for adjustment"), chart paper CP used only for the routine diagnosis (hereinafter referred to as "chart paper CP exclusive for diagnosis"), and chart paper CP used for both of the routine adjustment and the routine diagnosis (hereinafter referred to as "chart paper CP for both adjustment and diagnosis"), as described later.

Each of the image forming apparatuses 100 may transmit only read image data of the chart paper CP for both adjustment and diagnosis and read image data of the chart paper CP exclusive for diagnosis to the server apparatus 200.

In some cases, the chart paper CP for routine adjustment and the chart paper CP for routine diagnosis are identical. In such cases, the image forming apparatus 100 transmits read image data of all sheets of chart paper CP to the server apparatus 200.

In other words, in such cases, all sheets of chart paper CP are the chart paper CP for both adjustment and diagnosis, and the image forming apparatus 100 transmits read image data of all of the sheets of chart paper CP for both adjustment and diagnosis to the server apparatus 200.

Each of the image forming apparatuses 100 determines, for each chart paper CP whose image has been read, whether the chart paper CP is the chart paper CP exclusive for adjustment, the chart paper CP exclusive for diagnosis, or the chart paper CP for both adjustment and diagnosis when transmitting read image data to the server apparatus 200.

In a case where the chart paper CP is the chart paper CP exclusive for diagnosis or the chart paper CP for both adjustment and diagnosis, the image forming apparatus 100 transmits read image data of the chart paper CP to the server apparatus 200.

Meanwhile, in a case where the chart paper CP is the chart paper CP exclusive for adjustment, the image forming apparatus 100 does not transmit read image data of the chart paper CP to the server apparatus 200.

In a case where read image data of chart paper CP exclusive for adjustment is not transmitted to the server apparatus 200 as in the present exemplary embodiment, read image data transmitted to the server apparatus 200 is reduced.

When the image forming apparatus 100 generates chart paper CP, the image forming apparatus 100 forms a code image KG on the chart paper CP as indicated by the reference sign 1D in FIG. 1.

The image forming apparatus 100 determines whether or not the chart paper CP is one to be transmitted to the server apparatus 200, for example, on the basis of information included in the code image KG formed on the chart paper CP.

The "code image KG" is an image in which information is encoded. The code image KG is, for example, a two-dimensional barcode or a one-dimensional barcode.

Note that information may be given to chart paper CP by giving text information to the chart paper CP instead of using the code image KG.

Alternatively, for example, information may be stored in an information storage medium such as an RFID tag, and this information storage medium may be given to chart paper CP.

In the present exemplary embodiment, when a chart image is formed on paper P, the code image KG is also formed on this paper P. In the present exemplary embodiment, the code image KG formed on the paper P together with the chart image includes information concerning a type of chart paper CP.

When the image forming apparatus 100 reads the chart paper CP, the image forming apparatus 100 determines whether or not the chart paper CP is one to be transmitted to the server apparatus 200 on the basis of the information concerning the type included in the code image KG.

Specifically, in the present exemplary embodiment, for example, the code image KG includes, as the information concerning the type, information indicating whether the chart paper CP is the chart paper CP exclusive for adjustment, the chart paper CP exclusive for diagnosis, or the chart paper CP for both adjustment and diagnosis.

In a case where the information included in the code image KG formed on the read chart paper CP is information indicative of the chart paper CP exclusive for diagnosis or the chart paper CP for both adjustment and diagnosis, the image forming apparatus 100 transmits read image data of the chart paper CP to the server apparatus 200.

In a case where the information included in the code image KG is information indicative of the chart paper CP exclusive for adjustment, the image forming apparatus 100 does not transmit read image data of the chart paper CP given this code image KG to the server apparatus 200.

Whether chart paper CP is the chart paper CP exclusive for adjustment, the chart paper CP exclusive for diagnosis, or the chart paper CP for both adjustment and diagnosis may be determined on the basis of an order of transport of chart paper CP in the image forming apparatus 100. In other words, the type of chart paper CP need not be determined on the basis of information included in the code image KG.

In the present exemplary embodiment, the image reading device 130 may be disposed inside the image forming apparatus 100 on a transport path for paper P, as described above.

In this case, the image forming apparatus 100 determines whether obtained read image data is read image data of the chart paper CP exclusive for adjustment, read image data of the chart paper CP exclusive for diagnosis, or read image data of the chart paper CP for both adjustment and diagnosis on the basis of an order of chart paper CP sequentially transported to the image reading device 130.

In this case, the image forming apparatus 100 first grasps an order of transport of sheets of chart paper CP and types of the transported sheets of chart paper CP on the basis of information of a print job for the sheets of chart paper CP.

Then, the image forming apparatus 100 determines whether each of read image data sequentially obtained is read image data of the chart paper CP exclusive for adjustment, read image data of the chart paper CP exclusive for diagnosis, or read image data of the chart paper CP for both adjustment and diagnosis on the basis of the order of the sheets of chart paper CP sequentially transported to the image reading device 130.

Then, also in this case, the image forming apparatus 100 transmits read image data of the chart paper CP exclusive for diagnosis or read image data of the chart paper CP for both adjustment and diagnosis among the read image data sequentially obtained to the server apparatus 200.

Transmission by Permission

The image forming apparatus 100 (see FIG. 1) may transmit read image data to the server apparatus 200 in a case where permission is given by a user.

In other words, the image forming apparatus 100 may output a reading result of the chart paper CP exclusive for diagnosis and a reading result of the chart paper CP for both adjustment and diagnosis to the server apparatus 200, which is an example of an external apparatus, in a case where permission is given by the user.

Specifically, in a case where this processing is performed, the user sets in advance in the image forming apparatus 100 whether or not to transmit read image data to the server apparatus 200.

In a case where the setting permits transmission, the image forming apparatus 100 transmits read image data of the chart paper CP exclusive for diagnosis and read image data of the chart paper CP for both adjustment and diagnosis to the server apparatus 200.

On the other hand, in a case where the setting does not permit transmission, the image forming apparatus 100 does not transmit read image data to the server apparatus 200.

Note that in the present exemplary embodiment, the user sets whether or not to transmit read image data to the server apparatus 200 by operating the operation receiving unit 132.

The image forming apparatus 100 may be configured not to generate the chart paper CP exclusive for diagnosis in a case where the setting that permits transmission is not made.

In other words, the image forming apparatus 100 may be configured not to generate the chart paper CP exclusive for diagnosis in a case where the user's setting is that read image data is not transmitted to the server apparatus 200.

Alternatively, in a case where the setting that permits transmission is not made, a chart image formed on chart paper CP may be changed so that a chart image used only for routine diagnosis is not formed.

Although each sheet of paper P becomes the chart paper CP exclusive for adjustment, the chart paper CP exclusive for diagnosis, or the chart paper CP for both adjustment and diagnosis in the above description, a chart image for routine adjustment and a chart image for routine diagnosis may be formed on a single sheet of paper P.

In this case, in a case where the setting that permits transmission is not made, the image forming apparatus 100 may be configured not to form a chart image for routine diagnosis. In this case, only a chart image for routine adjustment is formed on chart paper CP.

Furthermore, also in a case where read image data cannot be transmitted to the server apparatus 200, for example, due to failure of communication between the image forming apparatus 100 and the server apparatus 200, the image forming apparatus 100 may be configured not to generate the chart paper CP exclusive for diagnosis or may be configured not to form a chart image for routine diagnosis.

Processing for Notifying User

The user may be notified of information indicating that read image data is transmitted to the server apparatus 200.

In a case where the user performs reading of chart paper CP, such a situation is also assumed in which the user does not know that read image data is transmitted to the server apparatus 200 thinking that he or she is performing routine adjustment.

In a case where the user is notified of information indicating that read image data is transmitted, the user can be notified that read image data is transmitted to an outside of the image forming apparatus 100.

This notification is, for example, given by the operation receiving unit 132 that is a touch panel.

Alternatively, the notification may be given to the user by giving information indicating that read image data is to be transmitted to the server apparatus 200 to chart paper CP whose read image data is to be transmitted to the server apparatus 200.

In other words, the notification may be given to the user by forming, on paper P on which a chart image is formed by the image forming unit 100A when routine adjustment is performed, an image including information indicating that a reading result of an image formed on the paper P is to be output to an outside.

More specifically, in this case, for example, when the chart paper CP exclusive for diagnosis or the chart paper CP for both adjustment and diagnosis is generated, information indicating that read image data is to be transmitted to the server apparatus 200 is given to this chart paper CP by using the image forming unit 100A.

The "information indicating that read image data is to be transmitted" may be given as an image such as an illustration or may be given as text information such as "scan image will be transmitted".

Furthermore, in the present exemplary embodiment, each chart paper CP is given apparatus identification information, which is information for identifying the image forming apparatus 100 used to generate the chart paper CP, as indicated by the reference sign 1G in FIG. 1. The apparatus identification information is, for example, model information or serial information.

In the present exemplary embodiment, the apparatus identification information is included in information stored in the code image KG formed on the chart paper CP.

In this way, the server apparatus 200 can be notified of information concerning the image forming apparatus 100 used to generate the chart paper CP. In other words, the server apparatus 200 can be notified of information concerning the image forming apparatus 100 on which routine diagnosis is to be made.

Furthermore, in the present exemplary embodiment, a security code and transmission control information, which is an example of information for control, is included in the information stored in the code image KG, as indicated by the reference sign 1H in FIG. 1. Details of the security code and the transmission control information will be described later.

In the present exemplary embodiment, the apparatus identification information, the security code, and the transmission control information are added to chart paper CP by the image forming unit 100A functioning as a part of an adding unit.

Chart Paper CP

FIG. 4 is a view for explaining chart paper CP.

In the present exemplary embodiment, when routine adjustment is performed, four sheets of chart paper CP illustrated in FIG. 4 are generated in the image forming apparatus 100, and then the four sheets of chart paper CP are read in the image forming apparatus 100.

A chart image, which is an example of an image for diagnosis, is formed on each of the four sheets of chart paper P.

In the present exemplary embodiment, chart paper P "for gradation adjustment", chart paper P "for unevenness adjustment/streak diagnosis No. 1", chart paper P "for unevenness adjustment/streak diagnosis No. 2", and chart paper P "for banding/density diagnosis" are generated as the four sheets of chart paper P.

Next, the user places the four sheets of chart paper CP in the image reading device 130 (see FIG. 1). Alternatively, the four sheets of chart paper CP sequentially pass the image reading device 130 provided inside the image forming apparatus 100. In this way, the four sheets of chart paper CP are read.

Three sheets of chart paper CP, that is, the chart paper CP "for gradation adjustment", the chart paper CP "for unevenness adjustment/streak diagnosis No. 1", and the chart paper CP "for unevenness adjustment/streak diagnosis No. 2" are used for routine adjustment, and the image forming unit 100A is adjusted by using read image data of these three sheets of chart paper CP.

Three sheets of chart paper CP, that is, the chart paper CP "for unevenness adjustment/streak diagnosis No. 1", the chart paper CP "for unevenness adjustment/streak diagnosis No. 2", and the chart paper CP "for banding/density diagnosis" are used for routine diagnosis, and read image data of these three sheets of chart paper CP are transmitted to the server apparatus 200. Then, the server apparatus 200 diagnoses the image forming apparatus 100.

Although the chart paper CP "for banding/density diagnosis" is unnecessary for the routine adjustment, the sheets of chart paper CP including this chart paper CP "for banding/density diagnosis" are generated when sheets of chart paper CP for the routine adjustment are generated since the chart paper CP "for banding/density diagnosis" is necessary for the routine diagnosis.

In this example, the chart paper CP "for gradation adjustment" corresponds to the chart paper CP exclusive for adjustment.

The chart paper CP "for unevenness adjustment/streak diagnosis No. 1" and the chart paper CP "for unevenness adjustment/streak diagnosis No. 2" correspond to the chart paper CP for both adjustment and diagnosis.

The chart paper CP "for banding/density diagnosis" corresponds to the chart paper CP exclusive for diagnosis.

Information Stored in Code Information

In the present exemplary embodiment, as illustrated in FIG. 1, the code image KG is formed on chart paper CP in addition to a chart image (not illustrated in FIG. 1), as described above.

In the present exemplary embodiment, the code image KG includes the apparatus identification information, the security code, and the transmission control information.

The apparatus identification information is information for identifying the image forming apparatus 100 used to generate chart paper CP, as described above.

The security code is information used to permit transmission of read image data of chart paper CP to the server apparatus 200. Note that this security code is not necessarily needed, and information given to chart paper CP need not include the security code.

The transmission control information is information used to control transmission of read image data of chart paper CP to the server apparatus 200.

In the present exemplary embodiment, chart paper CP on which a chart image has been formed by the image forming unit 100A is read by the image forming apparatus 100 or a second image forming apparatus 102, which will be described later, and a reading result of the chart paper CP is acquired by these image forming apparatuses 100.

Then, the reading result is output from these image forming apparatuses 100. The transmission control information is used for the output of the reading result.

In the present exemplary embodiment, each chart paper CP is given, as the transmission control information, information indicating whether the chart paper CP is the chart paper CP exclusive for adjustment, the chart paper CP exclusive for diagnosis, or the chart paper CP for both adjustment and diagnosis.

In other words, in the present exemplary embodiment, information concerning a type of chart paper CP is given to the chart paper CP as the transmission control information.

In the present exemplary embodiment, in a case where information indicative of the chart paper CP exclusive for diagnosis or the chart paper CP for both adjustment and diagnosis is included in the code image KG as the transmission control information, read image data of the chart paper CP given this code image KG is transmitted to the server apparatus 200.

Meanwhile, in the present exemplary embodiment, in a case where information indicative of the chart paper CP exclusive for adjustment is included in the code image KG as the transmission control information, read image data of the chart paper CP given this code image KG is not transmitted to the server apparatus 200.

It can be said that the information concerning the type of chart paper CP is information indicative of a transmission level.

In the present exemplary embodiment, there are two kinds of information "transmission level 1" and "transmission level 2" as the information indicative of the transmission level.

In the present exemplary embodiment, information indicative of the chart paper CP exclusive for diagnosis or the chart paper CP for both adjustment and diagnosis is information of "transmission level 2", and information indicative of the chart paper CP exclusive for adjustment is information of "transmission level 1".

In the present exemplary embodiment, when the routine adjustment is performed, read image data of the chart paper CP exclusive for diagnosis and read image data of the chart paper CP for both adjustment and diagnosis are transmitted to the server apparatus 200, and read image data of the chart paper CP exclusive for adjustment is not transmitted to the server apparatus 200, as described above.

This means that when the routine adjustment is performed, read image data of chart paper CP given the transmission level 2 is transmitted to the server apparatus 200, and read image data of chart paper CP given the transmission level 1 is not transmitted to the server apparatus 200.

The information concerning the type of chart paper CP is used for control of output of read image data from the image forming apparatus 100 and therefore can be said as information for control used for control of output of read image data from the image forming apparatus 100.

In the present exemplary embodiment, information indicative of a transmission level is given to each sheet of chart paper CP, and the image forming apparatus 100 determines whether or not to transmit read image data of the chart paper CP on the basis of the information indicative of a transmission level.

In the present exemplary embodiment, the image forming apparatus 100 transmits read image data of chart paper CP given the transmission level 2 to the server apparatus 200, as described above.

The image forming apparatus 100 does not transmit read image data of chart paper CP given the transmission level 1 to the server apparatus 200.

Transmission Processing for Each Mode of Image Forming Apparatus 100

Figure 5:
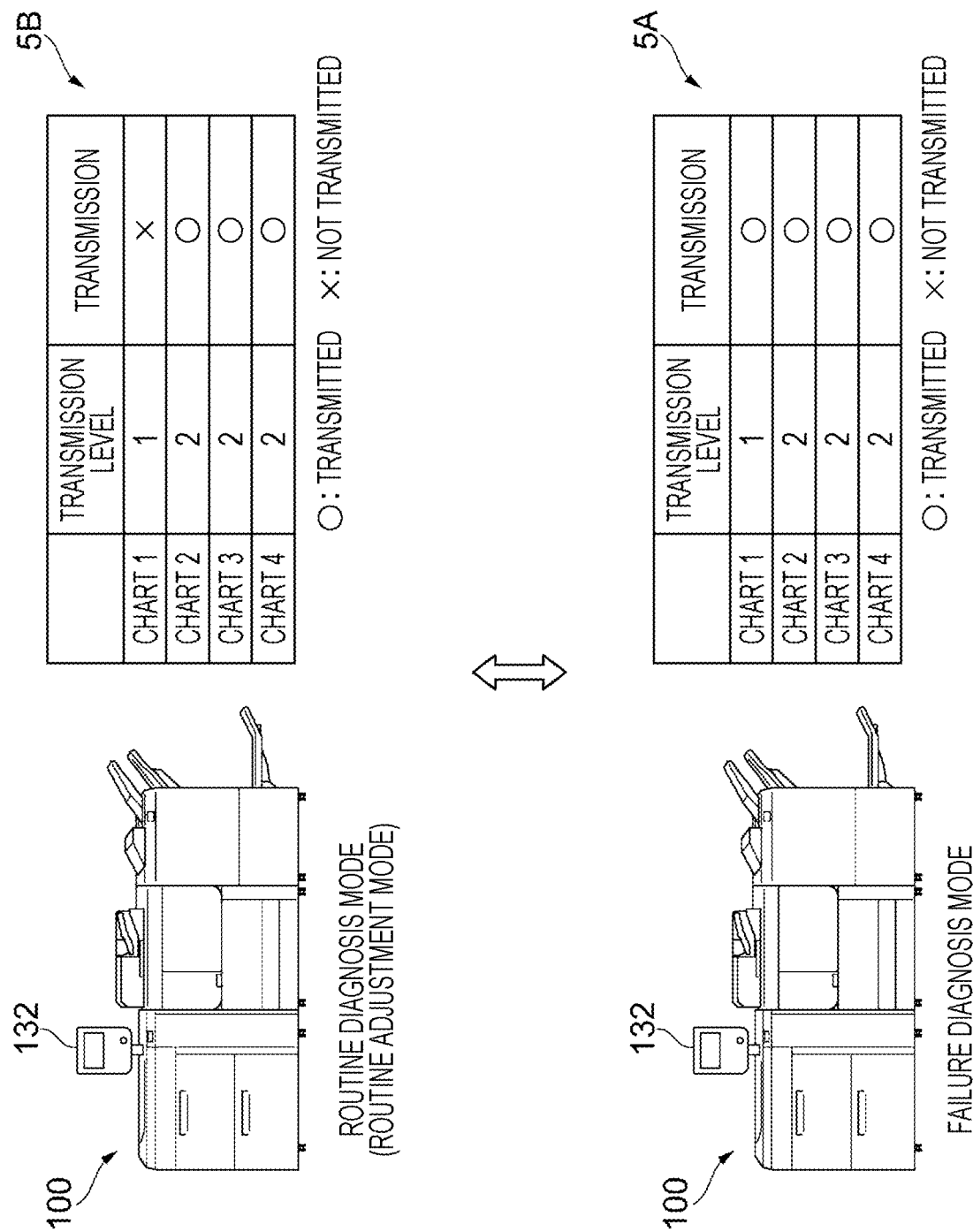
FIG. 5 is a view for explaining transmission processing for each mode of the image forming apparatus.

FIG. 5 is a view for explaining transmission processing for each mode of the image forming apparatus 100.

Processing for transmitting read image data in a routine diagnosis mode has been described above.

In the processing for transmitting read image data in the routine diagnosis mode, read image data of chart paper CP given the transmission level 2 is transmitted to the server apparatus 200, and read image data of chart paper CP given the transmission level 1 is not transmitted to the server apparatus 200, as described above.

In this case, a reading result of a chart image that is used for adjustment but is not used for diagnosis is not output to the server apparatus 200.

In the present exemplary embodiment, there is a failure diagnosis mode in addition to the routine diagnosis mode although description thereof is omitted in the above description. Also in the failure diagnosis mode, read image data is transmitted to the server apparatus 200.

In the present exemplary embodiment, a mode of the image forming apparatus 100 is switchable.

In the present exemplary embodiment, the mode of the image forming apparatus 100 is switched between the routine diagnosis mode, which is an example of a first mode, and the failure diagnosis mode, which is an example of a second mode, in accordance with user's switching of the mode.

Specifically, in the present exemplary embodiment, for example, the mode of the image forming apparatus 100 is switched by a user's operation of the operation receiving unit 132.

In the present exemplary embodiment, the mode of the image forming apparatus 100 becomes either the routine diagnosis mode or the failure diagnosis mode in accordance with this switching.

The "failure diagnosis mode" is a mode for diagnosing a failure occurring in the image forming apparatus 100.

The failure diagnosis mode is a mode for more closely diagnosing a state of the image forming apparatus 100 than the routine diagnosis mode.

The server apparatus 200 (see FIG. 1) diagnoses the image forming apparatus 100 that is in the failure diagnosis mode by using more information than information used to diagnose the image forming apparatus 100 that is in the routine diagnosis mode.

In the failure diagnosis mode, the image forming apparatus 100 is diagnosed by using a larger number of reading results than in the routine diagnosis mode. In other words, in the failure diagnosis mode, the image forming apparatus 100 is diagnosed by using a larger number of reading results of chart images than reading results of chart images used in the routine diagnosis mode.

Note that in the failure diagnosis mode, only processing for transmitting read image data to the server apparatus 200 is performed without performing the adjustment processing.

In the present exemplary embodiment, when the mode of the image forming apparatus 100 switches to the failure diagnosis mode, chart paper CP whose read image data is to be transmitted from the image forming apparatus 100 to the server apparatus 200 changes.

In other words, in the present exemplary embodiment, when the mode of the image forming apparatus 100 switches to the failure diagnosis mode, read image data to be transmitted from the image forming apparatus 100 to the server apparatus 200 changes.

The image forming apparatus 100 determines whether or not to transmit read image data to the server apparatus 200 on the basis of information concerning the mode of the image forming apparatus 100 and information concerning a transmission level included in the transmission control information.

In other words, the image forming apparatus 100 controls output of a reading result obtained by reading a chart image on the basis of information concerning the mode of the image forming apparatus 100, which is an example of own apparatus information, and information concerning a transmission level given to each chart paper CP.

In other words, the image forming apparatus 100 controls output of a reading result obtained by reading a chart image on the basis of own apparatus information, which is information concerning this image forming apparatus 100, and information concerning a type of chart image formed on chart paper CP.

Each of the image forming apparatuses 100 transmits read image data of all of the four sheets of chart paper CP to the server apparatus 200 as indicated by the reference sign 5A in FIG. 5 in a case where the image forming apparatus 100 is in the failure diagnosis mode.

In this case, the image forming apparatus 100 also transmits read image data of the chart paper CP exclusive for adjustment, which is chart paper CP given the "transmission level 1", to the server apparatus 200.

The "transmission level 1" is an example of information for control used to control output of read image data.

In the present exemplary embodiment, information for control, such as the "transmission level 1", for controlling output of read image data from the image forming apparatus 100 to vary depending on the mode of the image forming apparatus 100 used to read chart paper CP is set in advance.

In the present exemplary embodiment, the information for control set in advance is added to chart paper CP.

More specifically, in the present exemplary embodiment, information for control that allows a reading result to be output in a case where the image forming apparatus 100 used to read chart paper CP is in the failure diagnosis mode, which is an example of a specific mode, and prohibits a reading result from being output in a case where the image forming apparatus 100 is not in the failure diagnosis mode is added to the chart paper CP "for gradation adjustment".

In this case, the image forming apparatus 100 also transmits read image data of the chart paper CP "for gradation adjustment" to the server apparatus 200 in a case where the image forming apparatus 100 is in the failure diagnosis mode.

In the present exemplary embodiment, in a case where the image forming apparatus 100 is in the failure diagnosis mode, in which more information should be transmitted to the server apparatus 200, read image data of all of the four sheets of chart paper CP including the chart paper CP exclusive for adjustment is transmitted to the server apparatus 200.

On the other hand, in the present exemplary embodiment, in a case where the image forming apparatus 100 is in the routine diagnosis mode, read image data of the chart paper CP exclusive for adjustment, which is chart paper CP given the transmission level 1, is not transmitted to the server apparatus 200 as indicated by the reference sign 5B in FIG. 5, as described above.

In the present exemplary embodiment, in a case where a type of chart paper CP is the transmission level 1, which is an example of a specific type, and the image forming apparatus 100 is in the routine diagnosis mode, a reading result of this chart paper CP is not output.

In this case, one or some reading results among all reading results of the sheets of chart paper CP are output to the server apparatus 200.

Specifically, in this case, a reading result used for diagnosis of the image forming apparatus 100 among all reading results is output to the server apparatus 200.

More specifically, in this case, a reading result of the chart paper CP for both adjustment and diagnosis and a reading result of the chart paper CP exclusive for diagnosis, which are chart paper CP given the transmission level 2, among all reading results are transmitted to the server apparatus 200.

On the other hand, in the present exemplary embodiment, a reading result other than the one or some reading results is also transmitted to the server apparatus 200 in a case where a predetermined condition is satisfied.

Specifically, in the present exemplary embodiment, the other reading result is also output to the server apparatus 200 in a case where the image forming apparatus 100 is in the failure diagnosis mode, which is an example of a specific mode, as described above.

More specifically, in the present exemplary embodiment, a reading result of the chart paper CP exclusive for adjustment is also output to the server apparatus 200 in a case where the image forming apparatus 100 is in the failure diagnosis mode, in which the image forming apparatus 100 is diagnosed by using more information than in the routine diagnosis mode.

In the present exemplary embodiment, when the image forming unit 100A provided in the image forming apparatus 100 is adjusted, the image forming unit 100A forms a chart image used for this adjustment and forms a chart image that is not used for this adjustment but is used for diagnosis on paper P.

In the present exemplary embodiment, at least a reading result of a chart image that is not used for adjustment of the image forming apparatus 100 but is used for diagnosis of the image forming apparatus 100 is output to the server apparatus 200 irrespective of the mode of the image forming apparatus 100.

In the present exemplary embodiment, in a case where the image forming apparatus 100 is in the routine diagnosis mode, read image data of the chart paper CP for both adjustment and diagnosis and read image data of the chart paper CP exclusive for diagnosis are transmitted to the server apparatus 200, but read image data of the chart paper CP exclusive for adjustment is not transmitted to the server apparatus 200, as described above.

On the other hand, in a case where the image forming apparatus 100 is in the failure diagnosis mode, read image data of all of the chart paper CP for both adjustment and diagnosis, the chart paper CP exclusive for diagnosis, and the chart paper CP exclusive for adjustment are transmitted to the server apparatus 200, as described above.

In the present exemplary embodiment, a code image KG on chart paper CP whose read image data is to be transmitted to the server apparatus 200 includes a security code indicative of permission of the transmission, as illustrated in FIG. 1.

In the present exemplary embodiment, each of the image forming apparatuses 100 determines the presence or absence of a security code, and does not transmit read image data to the server apparatus 200 in a case where paper P has no code image KG or in a case where a security code acquired from a code image KG is not one registered in advance.

In the present exemplary embodiment, it can be said that the security code is information for determining whether or not chart paper CP is one whose read image data is to be transmitted.

In the present exemplary embodiment, transmission of read image data to the server apparatus 200 is controlled on the basis of the security code and the transmission control information in each of the routine diagnosis mode and the failure diagnosis mode.

It is also assumed that when routine diagnosis or failure diagnosis is performed, paper P that is irrelevant with the routine diagnosis or the failure diagnosis is read together with chart paper CP.

In this case, since a security code registered in advance is not given to the paper P irrelevant with the routine diagnosis or the failure diagnosis, read image data of this paper P irrelevant with the routine diagnosis or the failure diagnosis is not transmitted to the server apparatus 200.

In a case where the code image KG includes only the security code, only two kinds of processing, that is, transmitting read image data and not transmitting read image data can be performed.

On the other hand, in a case where the code image KG also includes the transmission control information as in the present exemplary embodiment, for example, read image data to be transmitted to the server apparatus 200 can be changed depending on the mode of the image forming apparatus 100, as described above.

In the present exemplary embodiment, in the routine diagnosis mode, read image data of the chart paper CP "for gradation adjustment", which is one of the sheets of chart paper CP, is not transmitted to the server apparatus 200.

On the other hand, in the present exemplary embodiment, when the mode of the image forming apparatus 100 is switched to the failure diagnosis mode, the read image data of this chart paper CP is also transmitted to the server apparatus 200.

In the present exemplary embodiment, even in a case where the routine diagnosis of the image forming apparatus 100 is not performed, the image forming unit 100A forms an image used for diagnosis of the image forming apparatus 100 on paper P. More specifically, even in a case where the routine diagnosis is not performed, the image forming unit 100A forms a chart image used for diagnosis of the image forming apparatus 100 on paper P.

More specifically, even in a case where the image forming apparatus 100 is in the failure diagnosis mode, the image forming unit 100A forms a chart image used for diagnosis of the image forming apparatus 100 on paper P in response to an instruction from the user or the like to generate chart paper CP.

In the present exemplary embodiment, even in a case where the image forming apparatus 100 is in the failure diagnosis mode, the image forming unit 100A generates the four sheets of chart paper CP.

In the present exemplary embodiment, a reading result output to the server apparatus 200 among reading results of chart images formed by the image forming unit 100A when the routine diagnosis is performed and a reading result output to the server apparatus 200 among reading results of chart images formed by the image forming unit 100A when the routine diagnosis is not performed are different.

In the present exemplary embodiment, the reading result output to the server apparatus 200 among reading results of chart images formed by the image forming unit 100A when the routine diagnosis is performed is read image data of the three sheets of chart paper CP "for unevenness adjustment/streak diagnosis No. 1", "for unevenness adjustment/streak diagnosis No. 2", and "for banding/density diagnosis".

Meanwhile, the reading result output to the server apparatus 200 among reading results of chart images formed by the image forming unit 100A when the routine diagnosis is not performed is read image data of the four sheets of chart paper CP "for gradation adjustment", "for unevenness adjustment/streak diagnosis No. 1", "for unevenness adjustment/streak diagnosis No. 2", and "for banding/density diagnosis".

In the present exemplary embodiment, in a case where the routine diagnosis is not performed, that is, in a case where the failure diagnosis is performed, the image forming apparatus 100 is diagnosed by using a larger number of reading results than when the routine diagnosis is performed.

Accordingly, in the present exemplary embodiment, in a case where the routine diagnosis is not performed, a larger number of reading results than in a case where the routine diagnosis is performed are output to the server apparatus 200.

In the present exemplary embodiment, the user sometimes notices a failure of the image forming apparatus 100 by referring to chart paper CP generated when the routine adjustment is performed. In this case, the user sometimes manually switches the mode of the image forming apparatus 100 to the failure diagnosis mode.

In this case, in the present exemplary embodiment, read image data of the chart paper CP "for gradation adjustment", which is the one of the sheets of chart paper CP, is also transmitted to the server apparatus 200.

In this case, the user places the four sheets of chart paper CP in the image reading device 130 again to read the four sheets of chart paper CP, and thereby read image data of the chart paper CP "for gradation adjustment", which is the one of the sheets of chart paper CP, is also transmitted to the server apparatus 200.

In the present exemplary embodiment, in a case where the routine adjustment is performed, the image forming unit 100A is adjusted, and read image data is transmitted to the server apparatus 200 to perform the routine diagnosis.

In this case, if read image data of all sheets of chart paper CP read by the image reading device 130 is transmitted to the server apparatus 200, a volume of the read image data becomes large, and a trouble such as a long transmission time may undesirably occur.

On the other hand, in the present exemplary embodiment, read image data of the chart paper CP exclusive for adjustment is not transmitted in a case where the routine adjustment is performed. This reduces a volume of read image data transmitted to the server apparatus 200.

Meanwhile, in the present exemplary embodiment, in the failure diagnosis mode, read image data of all sheets of chart paper CP is transmitted to the server apparatus 200 in order to more accurately grasp a cause of a failure. In this case, read image data of all sheets of chart paper CP including the chart paper CP exclusive for adjustment is transmitted to the server apparatus 200.

As a result, the image forming apparatus 100 can be diagnosed by the server apparatus 200 on the basis of more information than in a case where read image data of one or some sheets of chart paper CP is not transmitted to the server apparatus 200 among all sheets of paper CP.

Another Example of Transmission Control Information

Another example of the transmission control information is information concerning date and time of printing of chart paper CP. In other words, another example of the transmission control information is information concerning date and time of the routine adjustment.

In this case, for example, information concerning date and time of printing of chart paper CP is included as the transmission control information in a code image KG formed on the chart paper CP.

In this case, in a case where the chart paper CP is read later, the image forming apparatus 100 acquires, for the chart paper CP, the information concerning date and time included in the transmission control information.

Furthermore, the image forming apparatus 100 acquires, for the chart paper CP, information concerning a transmission level included in the transmission control information. In other words, the image forming apparatus 100 acquires, for the chart paper CP, type information concerning a type of chart paper CP.

Next, the image forming apparatus 100 acquires a time difference between a time specified by the information concerning the date and time of printing and a current time.

In other words, in this case, the image forming apparatus 100 acquires a time difference between a time specified by the information concerning the date and time of printing and a time of reading of the chart paper CP.

In a case where the time difference exceeds a predetermined period (e.g., 10 minutes), the image forming apparatus 100 also transmits read image data of chart paper CP given the transmission level 1 to the server apparatus 200.

More specifically, in a case where the time difference exceeds the predetermined period, the image forming apparatus 100 also transmits read image data of the chart paper CP exclusive for adjustment to the server apparatus 200.

In this processing example, the time specified by the information concerning the date and time of printing and status information, which is information concerning a status of reading of the chart paper CP by the image reading device 130, are acquired.

Specifically, in this case, timing information, which is information concerning a timing of reading of the chart paper CP by the image reading device 130, is acquired as the status information.

In this case, in a case where the timing specified by the timing information is later than a predetermined timing, a reading result of chart paper CP given the transmission level 1 is also output.

On the other hand, in a case where the timing specified by the timing information is earlier than the predetermined timing, a reading result of chart paper CP given the transmission level 1 is not output.

More specifically, in this case, in a case where the timing specified by the timing information is later than a timing of elapse of the 10 minutes, a reading result of chart paper CP given the transmission level 1 is output.

On the other hand, in a case where the timing specified by the timing information is earlier than the timing of elapse of the 10 minutes, a reading result of chart paper CP given the transmission level 1 is not output.

In this processing example, in a case where a type specified by the type information is, for example, the transmission level 1, which is an example of a specific type, and the timing specified by the timing information is later than the timing of elapse of the 10 minutes, a reading result of chart paper CP given the transmission level 1 is output.

On the other hand, in a case where the type specified by the type information is, for example, the transmission level 1 and the timing specified by the timing information is earlier than the timing of elapse of the 10 minutes, a reading result of chart paper CP given the transmission level 1 is output.

In other words, in this case, in a case where an elapsed period from formation of a chart image on chart paper CP given the transmission level 1 to a time when a reading result of this chart paper CP is obtained exceeds a predetermined period, the image forming apparatus 100 outputs the reading result to the server apparatus 200.

On the other hand, in a case where the elapsed period from formation of a chart image on chart paper CP given the transmission level 1 to a time when a reading result of this chart paper CP is obtained does not exceed the predetermined period, the image forming apparatus 100 does not output the reading result to the server apparatus 200.

In this processing example, information for control for varying output of a reading result from the image forming apparatus 100 depending on a status of reading of chart paper CP by the image forming apparatus 100 is added to the chart paper CP as the information for control.

More specifically, in this processing example, information for control for varying output of a reading result from the image forming apparatus 100 depending on a timing of reading of chart paper CP by the image forming apparatus 100 is added to the chart paper CP as the information for control.

More specifically, in this processing example, information concerning date and time of printing of chart paper CP is added to the chart paper CP as the information for control.

In other words, in this processing example, information concerning a timing of formation of a chart image on paper P by the image forming unit 100A provided in the image forming apparatus 100 used to generate chart paper CP is added to the chart paper CP.

FIG. 6 illustrates a reference table referred to by the image forming apparatus 100.

In this reference table, a relationship between the time difference described above and whether or not to transmit read image data is registered in advance. The reference table is stored in the secondary storage unit 12 (see FIG. 2).

The image forming apparatus 100 determines whether or not to transmit read image data by referring to the reference table.

Specifically, by referring to the reference table, for example, the image forming apparatus 100 decides to transmit read image data of the chart paper CP exclusive for adjustment, which is chart paper CP given the transmission level 1, to the server apparatus 200 in a case where 10 minutes have elapsed from date and time of printing of the chart paper CP exclusive for adjustment.

In a case where 10 minutes have elapsed from date and time of printing of the chart paper CP exclusive for adjustment given the transmission level 1, the image forming apparatus 100 decides to transmit read image data to the server apparatus 200.

In this case, read image data of the chart paper CP exclusive for adjustment given the transmission level 1 is transmitted to the server apparatus 200.

In this case, even in a case where the user has not switched the mode of the image forming apparatus 100 to the failure diagnosis mode, read image data of the chart paper CP exclusive for adjustment is transmitted to the server apparatus 200.

Also in this case, read image data of a larger number of sheets of chart paper CP are transmitted to the server apparatus 200, and the image forming apparatus 100 is diagnosed by the server apparatus 200 on the basis of more information.

Assume that the user finds a trouble when the routine adjustment is performed.

The user is often unfamiliar with how to cope with a trouble, and in this case, it is assumed that the user places chart paper CP in the image reading device 130 (see FIG. 1) after elapse of 10 minutes or more from printing of the chart paper CP.

In this case, when the chart paper CP is read, even in a case where the chart paper CP is chart paper CP exclusive for adjustment given the transmission level 1, read image data of the chart paper CP exclusive for adjustment is transmitted to the server apparatus 200, as described above.

In the present exemplary embodiment, in a case where a transmission level of chart paper CP is the transmission level 1, read image data of this chart paper CP is not transmitted to the server apparatus 200 basically.

However, in this processing example, in a case where a specific condition is satisfied, for example, in a case where 10 minutes have elapsed from printing of chart paper CP, read image data is transmitted to the server apparatus 200 even in a case where the chart paper CP is chart paper CP given the transmission level 1.

In a case where this processing is performed, the image forming apparatus 100 shifts to a mode substantially close to the failure diagnosis mode even in a case where the user does not know an operation for switching the mode of the image forming apparatus 100 to the failure diagnosis mode. As a result, more read image data are transmitted to the server apparatus 200.

In a case where the user performs the normal routine adjustment, chart paper CP is often read by the image reading device 130 within 10 minutes from printing of the chart paper CP.

In this case, read image data of the chart paper CP given the transmission level 1 is not transmitted to the server apparatus 200. Specifically, read image data of the chart paper CP exclusive for adjustment is not transmitted to the server apparatus 200.

On the other hand, in a case where 10 minutes have elapsed from printing of chart paper CP, read image data is transmitted to the server apparatus 200 even in a case where the chart paper CP is chart paper CP given the transmission level 1.

Specifically, in a case where 10 minutes have elapsed from printing of chart paper CP, read image data is transmitted to the server apparatus 200 even in a case where the chart paper CP is chart paper CP exclusive for adjustment.

In the present exemplary embodiment, the transmission level 2 (see FIG. 5) is given to the chart paper CP for both adjustment and diagnosis and the chart paper CP exclusive for diagnosis, and the image forming apparatus 100 transmits read image data of the chart paper CP for both adjustment and diagnosis and the chart paper CP exclusive for diagnosis to the server apparatus 200 irrespective of whether or not the 10 minutes have elapsed.

As for the chart paper CP for both adjustment and diagnosis and the chart paper CP exclusive for diagnosis, read image data is transmitted to the server apparatus 200 even before elapse of the 10 minutes, and read image data is transmitted to the server apparatus 200 even after elapse of the 10 minutes.

On the other hand, as for the chart paper CP exclusive for adjustment, read image data is transmitted to the server apparatus 200 after elapse of the 10 minutes.

In addition, a transmission level 0 may be given to chart paper CP, as indicated by the reference sign 6A in FIG. 6.

As for chart paper CP given the transmission level 0, the image forming apparatus 100 does not transmit read image data to the server apparatus 200 at all in a case where the image forming apparatus 100 is in the routine diagnosis mode.

As for chart paper CP given the transmission level 0, the image forming apparatus 100 does not transmit read image data to the server apparatus 200 irrespective of whether or not the 10 minutes have elapsed, as long as the image forming apparatus 100 is in the routine diagnosis mode.

As for chart paper CP given the transmission level 0, the image forming apparatus 100 transmits read image data to the server apparatus 200 only in a case where the image forming apparatus 100 is in the failure diagnosis mode.

The 10 minutes are an example, and may be changed in accordance with an instruction from the user. Furthermore, this period may be a period other than 10 minutes.

In the reference table illustrated in FIG. 6, a relationship between the security code and whether or not to transmit read image data is also registered.

In a case where the security code matches a security code registered in advance, the image forming apparatus 100 transmits read image data to the server apparatus 200, as described above.

In a case where the security code does not match a security code registered in advance, the image forming apparatus 100 does not transmit read image data to the server apparatus 200.

Another Processing Example

Whether or not to transmit read image data to the server apparatus 200 may be determined on the basis of a past record of reading of chart paper CP irrespective of the transmission control information.

Specifically, in a case where this processing is performed, for example, the image forming apparatus 100 acquires, from a code image KG on each chart paper CP, paper identification information, which is information included in the code image KG and is for identifying the chart paper CP, every time the chart paper CP is read.

In a case where this processing is performed, each code image KG includes the paper identification information for identifying chart paper CP on which this code image KG is formed.

When chart paper CP is read, the image forming apparatus 100 acquires and holds paper identification information given to this chart paper CP.

Furthermore, the image forming apparatus 100 compares new paper identification information acquired from a code image KG and paper identification information already held in the image forming apparatus 100 every time chart paper CP is read, and thereby determines whether or not the new paper identification information matches the paper identification information already held in the image forming apparatus 100.

In a case where the image forming apparatus 100 determines that the new paper identification information matches the paper identification information already held in the image forming apparatus 100, the image forming apparatus 100 determines that the chart paper CP has been read plural times.

In this case, even in a case where the chart paper CP determined to have been read plural times is chart paper CP exclusive for adjustment, the image forming apparatus 100 transmits read image data of this chart paper CP exclusive for adjustment to the server apparatus 200.

In other words, in this case, even in a case where the chart paper CP determined to have been read plural times is chart paper CP given the transmission level 1, the image forming apparatus 100 transmits read image data of this chart paper CP to the server apparatus 200.

Such a situation is also assumed in which the user performs first reading of chart paper CP when the routine adjustment is performed and then performs second reading of the chart paper CP.

In this case, the same chart paper CP is read plural times.

In this case, new paper identification information acquired from the code image KG and paper identification information already held by the image forming apparatus 100 match each other.

In this case, in this processing example, even in a case where the chart paper CP is chart paper CP given the transmission level 1, read image data of this chart paper CP is transmitted to the server apparatus 200.

In this case, for example, in a case where chart paper CP exclusive for adjustment is read two times, read image data of this chart paper CP exclusive for adjustment is transmitted to the server apparatus 200.

In other words, in this case, in a case where the number of times of reading of a chart image included in the chart paper CP exclusive for adjustment by the image reading device 130 exceeds a predetermined number, a reading result of this chart paper CP exclusive for adjustment is also output to the server apparatus 200.

In a case where this processing is performed, the image forming apparatus 100 acquires, as the own apparatus information, number information, which is information concerning the number of times of reading of chart paper CP by the image reading device 130. The image forming apparatus 100 controls output of a reading result on the basis of the number information and information given to the chart paper CP.

In this processing example, the image forming apparatus 100 acquires type information, which is information on a type of chart paper CP, as the information given to the chart paper CP, as described above.

The image forming apparatus 100 controls output of a reading result on the basis of the number information and the type information.

Specifically, for example, in a case where a type specified by the type information is the transmission level 1, which is an example of a specific type, the image forming apparatus 100 outputs a reading result in a case where the number specified by the number information exceeds a predetermined number.

On the other hand, in a case where the number specified by the number information does not exceed the predetermined number, the image forming apparatus 100 does not output a reading result.

As a result, also in this case, even in a case where the user does not know an operation for switching the mode of the image forming apparatus 100 to the failure diagnosis mode, read image data of chart paper CP given the transmission level 1 is transmitted to the server apparatus 200.

Note that in this processing example, read image data of chart paper CP given the transmission level 2 is transmitted to the server apparatus 200 irrespective of the number of times of reading by the image forming apparatus 100.

Furthermore, read image data of chart paper CP given the transmission level 0 is not transmitted to the server apparatus 200 irrespective of the number of times of reading by the image forming apparatus 100.

In a case where the image forming apparatus 100 is in the failure diagnosis mode, read image data of chart paper CP given the transmission level 0 is transmitted to the server apparatus 200.

Furthermore, in this processing example, in a case where chart paper CP is read after the image forming apparatus 100 shifts to the failure diagnosis mode, read image data of all sheets of chart paper CP is transmitted to the server apparatus 200 irrespective of the number of times of reading.

In the processing based on the number described above, information for control for varying output of a reading result from the image forming apparatus 100 depending on the number of times of reading of chart paper CP by the image forming apparatus 100 used to read the chart paper CP is added to the chart paper CP as the information for control.

In a case where the processing based on the number described above is performed, the paper identification information, which is an example of medium identification information for identifying chart paper CP, is added to the chart paper CP as the information for control.

In the processing based on the number, information concerning the number of times of reading of chart paper CP is acquired on the basis of the paper identification information, and whether or not to transmit a reading result to the server apparatus 200 is determined on the basis of the information concerning the number and the type information.

Another Processing Example

Although information concerning date and time of printing of chart paper CP is included in a code image KG in the above description, the image forming apparatus 100 may hold this information concerning date and time of printing.

Specifically, in this case, the image forming apparatus 100 holds, for each printed chart paper CP, paper identification information and date and time information, which is information concerning date and time of printing, in association with each other.

In this case, in a case where latest reading of chart paper CP is performed, the image forming apparatus 100 determines whether or not paper identification information identical to paper identification information acquired from a code image KG of this chart paper CP is held.

In a case where the identical paper identification information is held, the image forming apparatus 100 acquires date and time information held in association with this paper identification information by reading out this date and time information.

In this case, the image forming apparatus 100 acquires a time difference between a time specified by the date and time information and a time of the latest reading.

In a case where the time difference exceeds a predetermined time difference, the image forming apparatus 100 transmits read image data to the server apparatus 200, for example, even in a case where the read image data is read image data of chart paper CP exclusive for adjustment, as in the above case.

In other words, also in this case, the image forming apparatus 100 also transmits read image data of chart paper CP given the transmission level 1 to the server apparatus 200.

Also in this case, even in a case where chart paper CP is chart paper CP exclusive for adjustment, read image data of the chart paper CP exclusive for adjustment is transmitted to the server apparatus 200. As a result, also in this case, read image data of a larger number of sheets of chart paper CP are transmitted to the server apparatus 200.

As in the above case, also in this case, read image data of chart paper CP given the transmission level 2 is transmitted to the server apparatus 200 irrespective of the time difference.

Furthermore, also in this case, read image data of chart paper CP given the transmission level 0 is not transmitted to the server apparatus 200 irrespective of the time difference.

Furthermore, in this case, in a case where chart paper CP is read after the image forming apparatus 100 shifts to the failure diagnosis mode, read image data of all sheets of chart paper CP are transmitted to the server apparatus 200 irrespective of the time difference.

Change of Reading Condition, Change of Transmission Condition

Furthermore, a reading condition for reading of chart paper CP and a transmission condition for transmission of read image data may vary depending on whether the image forming apparatus 100 is in the routine diagnosis mode or in the failure diagnosis mode.

In other words, at least one of a reading condition, which is a condition for reading of a chart image by the image reading device 130, and a processing condition for processing performed on a read image obtained by this reading may be changed depending on a mode of diagnosis of the image forming apparatus 100.

Specifically, for example, in a case where the image forming apparatus 100 is in the routine diagnosis mode, chart paper CP is read at a low resolution and/or a degree of compression of read image data is increased, and this read image data is transmitted to the server apparatus 200.

On the other hand, in a case where the image forming apparatus 100 is in the failure diagnosis mode, chart paper CP is read at a higher resolution than in the routine diagnosis mode. In other words, in this case, a resolution at which the image reading device 130 reads a chart image is increased.

Furthermore, in a case where the image forming apparatus 100 is in the failure diagnosis mode, a degree of compression of read image data is made lower than in the routine diagnosis mode or the read image data is not compressed, and the read image data is transmitted to the server apparatus 200.

In other words, in this case, a compression rate of a read image is reduced or a read image is not compressed.

In a case where a read image is compressed in the routine diagnosis mode, when the mode is switched to the failure diagnosis mode, a compression rate is reduced or the read image is not compressed.

In diagnosis of the image forming apparatus 100 in the routine diagnosis mode, a state of image quality is grasped or tendency is grasped, and therefore low resolution or high compression are less likely to lead to a trouble.

On the other hand, in the failure diagnosis mode, the presence or absence of a failure and where a failure is occurring are diagnosed, and it is therefore desirable that a resolution at which chart paper CP is read is increased to a high resolution and/or a compression rate of read image data is reduced or read image data is not compressed.

Note that both of the change of the reading resolution depending on the mode and the change of the compression rate depending on the mode may be performed or only one of them may be performed.

Furthermore, a processing condition of a read image obtained by reading a chart image by the image reading device 130 may be changed depending on a status of reading of a chart image by the image reading device 130.

In other words, a processing condition of a read image obtained by reading chart paper CP may be changed depending on a status of reading of the chart paper CP.

More specifically, for example, the processing condition may be changed depending on an elapsed period from date and time of printing of chart paper CP.

Specifically, for example, in a case where the time difference described above is less than 10 minutes, which are an example of a predetermined period, read image data is compressed at a high compression rate and is then transmitted to the server apparatus 200.

On the other hand, for example, in a case where the time difference is larger than 10 minutes, which are an example of the predetermined period, read image data is compressed at a low compression rate or is not compressed and is then transmitted to the server apparatus 200.

In this processing example, in a case where an elapsed period from date and time of printing of chart paper CP exceeds a predetermined threshold value, a compression rate of read image is made lower than that in a case where the elapsed period from date and time of printing of the chart paper CP does not exceed the predetermined threshold value.

Alternatively, in this processing example, in a case where the elapsed period from date and time of printing of the chart paper CP exceeds the predetermined threshold value, compression of read image is not performed.

In other words, in a case where the elapsed period does not exceed the predetermined threshold value, compression of read image is performed, whereas in a case where the elapsed period does not exceed the predetermined threshold value, compression of read image is not performed.

In a case where the above processing is performed, a processing condition of a read image is changed depending on an elapsed period from generation of chart paper CP to reading of this chart paper CP.

In other words, in a case where the above processing is performed, a processing condition of a read image is changed depending on whether or not an elapsed period from generation of chart paper CP to reading of the chart paper CP exceeds a predetermined threshold value.

Furthermore, a processing condition may be changed on the basis of a past record of reading of chart paper CP.

More specifically, a processing condition of a read image may be changed depending on the number of times of reading of a chart image by the image reading device 130.

More specifically, a processing condition of a read image may be changed depending on whether or not the number of times of reading of a chart image by the image reading device 130 exceeds a predetermined threshold value.

Specifically, for example, in a case where the number of times of reading of chart paper CP is not larger than a predetermined number (e.g., "1"), for example, in a case where the number of times of reading of chart paper CP is 1, read image data is compressed at a high compression rate, and this read image data is transmitted to the server apparatus 200.

On the other hand, for example, in a case where the number of times of reading of chart paper CP is larger than the predetermined number, for example, in a case where the number of times of reading of chart paper CP is 2, read image data is compressed at a low compression rate, and this read image data is transmitted to the server apparatus 200.

In other words, in a case where the number of times of reading is larger than the predetermined threshold value, a read image is compressed at a lower compression rate than in a case where the number of times of reading is not larger than the predetermined threshold value, and then the read image data is transmitted to the server apparatus 200.

Furthermore, in a case where the number of times of reading of chart paper CP is larger than the predetermined number, for example, in a case where the number of times of reading of chart paper CP is 2, read image data is transmitted to the server apparatus 200 without being compressed.

In other words, in this case, in a case where the number of times of reading is not larger than a predetermined threshold value, a read image is compressed, whereas in a case where the number of times of reading is larger than the predetermined threshold value, a read image is not compressed.

In this case, in a case where the number of times of reading is larger than the predetermined threshold value, a read image is not compressed, and the read image that has not been compressed is transmitted to the server apparatus 200.

Processing Performed in Case Where Chart Image is Read by Another Image Forming Apparatus 100

Figure 7:
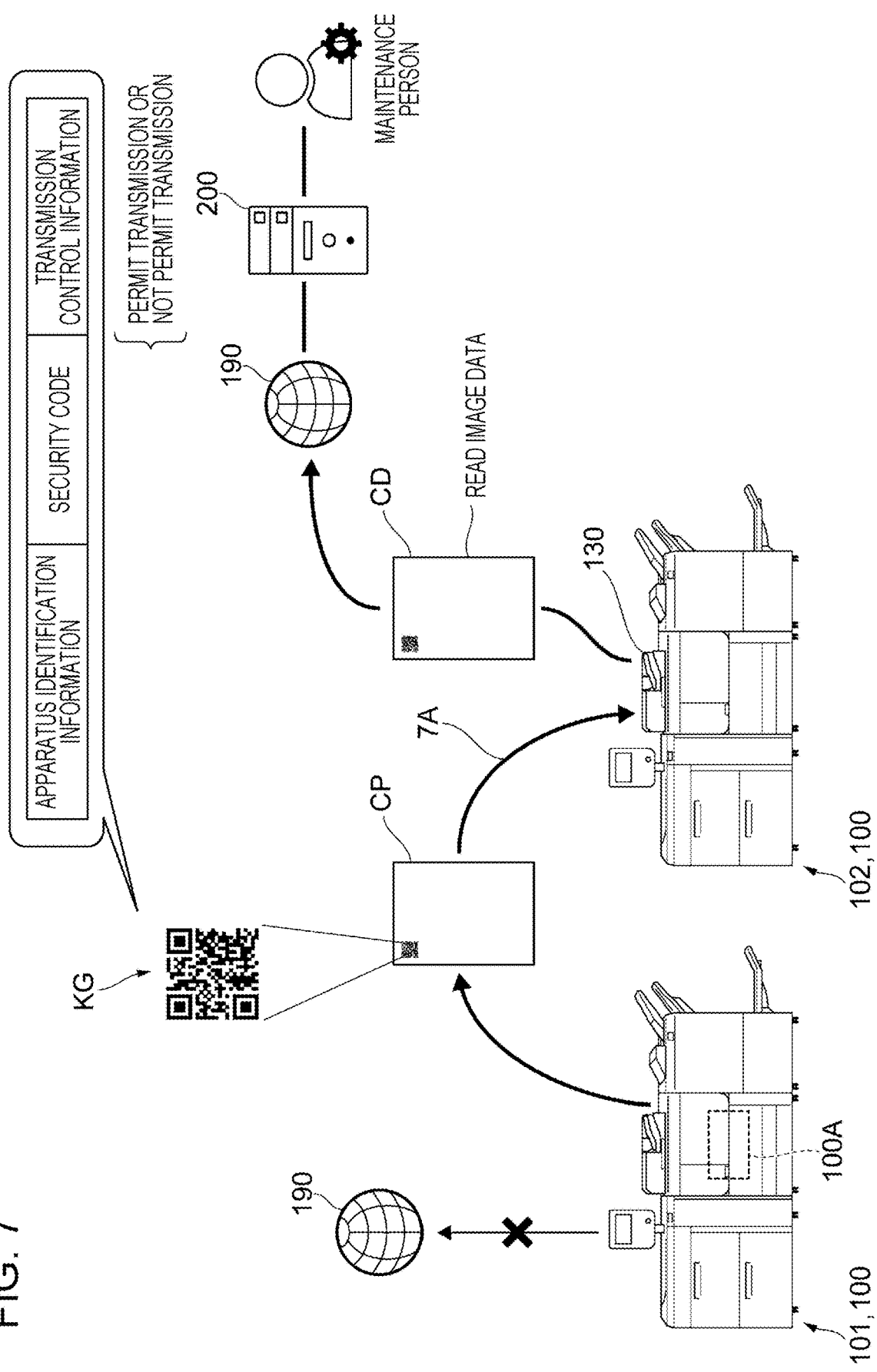
FIG. 7 illustrates a processing example of a case where chart paper is read by an image forming apparatus different from an image forming apparatus used to generate the chart paper.

FIG. 7 illustrates a processing example in a case where chart paper CP is read by an image forming apparatus 100 (hereinafter referred to as a "second image forming apparatus 102") different from the image forming apparatus 100 (hereinafter referred to as a "first image forming apparatus 101") used to generate the chart paper CP.

In this processing example, chart paper CP generated by the first image forming apparatus 101, which is an example of one image forming apparatus, is read by the second image forming apparatus 102, which is another image forming apparatus having an image reading function.

In this processing example, read image data obtained by this reading is transmitted from the second image forming apparatus 102 to the server apparatus 200.

Next, the server apparatus 200 or a maintenance person who accesses the server apparatus 200 diagnoses the first image forming apparatus 101.

Then, in this processing example, the server apparatus 200 acquires a result of the diagnosis made on the first image forming apparatus 101.

Not all image forming apparatuses 100 are connected to the communication line 190, and such a situation is also assumed in which an image forming apparatus 100 for which routine diagnosis or failure diagnosis is desired is not connected to the communication line 190.

Furthermore, such a situation is also assumed in which read image data cannot be transmitted from an image forming apparatus 100 for which routine diagnosis or failure diagnosis is desired to the server apparatus 200 due to a communication failure.

Furthermore, such a situation is also assumed in which the image reading device 130 for reading chart paper CP is not provided in an image forming apparatus 100 for which routine diagnosis or failure diagnosis is desired.

In these cases, in the present exemplary embodiment, chart paper CP generated by the first image forming apparatus 101 is read by the second image forming apparatus 102. Then, read image data obtained by the second image forming apparatus 102 is transmitted to the server apparatus 200.

Even in these cases, routine diagnosis or failure diagnosis of the first image forming apparatus 101 can be performed in this way.

In this processing example illustrated in FIG. 7, the first image forming apparatus 101 is not connected to the communication line 190, and read image data is transmitted from the second image forming apparatus 102 connected to the communication line 190 to the server apparatus 200.

Specifically, chart paper CP generated by the first image forming apparatus 101 is read by using the image reading device 130 provided in the second image forming apparatus 102.

Then, read image data obtained by this reading is transmitted from the second image forming apparatus 102 to the server apparatus 200.

There is a possibility that the first image forming apparatus 101 and the second image forming apparatus 102 are different in performance of reading chart paper CP.

In this case, in a case where chart paper CP generated by the first image forming apparatus 101 is read by the second image forming apparatus 102, there is a possibility that routine diagnosis or failure diagnosis of the first image forming apparatus 101 cannot be accurately performed.

Specifically, for example, a gradation property of reading by the second image forming apparatus 102 is different from a gradation property of reading by the first image forming apparatus 101 in some cases. In such cases, for example, there is a possibility that diagnosis concerning a density becomes inaccurate.

Furthermore, for example, in a case where resolution of reading by the second image forming apparatus 102 is low, there is a possibility that quality of reading of chart paper CP for measurement of color registration generated by the first image forming apparatus 101 decreases.

In order to suppress occurrence of such troubles, reading by the second image reading device 130 is controlled by using transmission control information in processing described below.

This makes it less likely that the above troubles occur.

In this processing example, apparatus identification information for identifying the first image forming apparatus 101 is included in a code image KG formed on chart paper CP generated by the first image forming apparatus 101, as in the above case.

Furthermore, in this processing example, a security code is included in the code image KG formed on the chart paper CP generated by the first image forming apparatus 101, as in the above case.

Furthermore, in this processing example, information indicating whether or not to permit transmission of read image data is included, as the transmission control information, in the code image KG formed on the chart paper CP generated by the first image forming apparatus 101.

Specifically, in this processing example, information indicating that transmission is not permitted is associated with the code image KG formed on the chart paper CP as the transmission control information in a case where the chart paper CP is chart paper CP whose reading result vanes depending on a difference in apparatus used to read the chart paper CP, such as chart paper CP used for density diagnosis.

Furthermore, information indicating that transmission is permitted is associated with the code image KG formed on the chart paper CP as the transmission control information in a case where the chart paper CP is chart paper CP that is less influenced by a difference in apparatus used to read the chart paper CP, such as chart paper CP used for diagnosis of banding.

Next, in the present exemplary embodiment, the chart paper CP generated by the first image forming apparatus 101 is placed in the second image forming apparatus 102, and then the second image forming apparatus 102 reads this chart paper CP, as indicated by the reference sign 7A.

When the second image forming apparatus 102 reads the chart paper CP, the apparatus identification information included in the code image KG formed on the chart paper CP is acquired.

Next, in the present exemplary embodiment, the second image forming apparatus 102 determines whether or not the image forming apparatus 100 used to generate the chart paper CP is the second image forming apparatus 102 on the basis of the apparatus identification information.

In this processing example, the image forming apparatus 100 used to generate the chart paper CP is the first image forming apparatus 101, and therefore the second image forming apparatus 102 determines that the image forming apparatus 100 used to generate the chart paper CP is not the second image forming apparatus 102.

In a case where the second image forming apparatus 102 determines that the image forming apparatus 100 used to generate the chart paper CP is not the second image forming apparatus 102, the second image forming apparatus 102 determines, for each chart paper CP, whether or not to transmit read image data to the server apparatus 200 on the basis of the transmission control information included in the code image KG formed on the chart paper CP.

Specifically, in a case where the chart paper is given transmission control information indicating that transmission is permitted, the second image reading device 130 determines that read image data is transmitted to the server apparatus 200.

Meanwhile, in a case where the chart paper CP is given transmission control information indicating that transmission is not permitted, the second image reading device 130 determines that read image data is not transmitted to the server apparatus 200.

Note that the read image data is transmitted to the server apparatus 200 in a case where the security code included in the code image KG matches a security code registered in advance, as in the above case.

That is, in a case where the chart paper CP is given transmission control information indicating that transmission is permitted and has a security code registered in advance, the second image forming apparatus 102 determines that read image data is transmitted to the server apparatus 200.

Meanwhile, in a case where the chart paper CP does not have a security code registered in advance, the second image forming apparatus 102 determines that read image data is not transmitted to the server apparatus 200 irrespective of contents of the transmission control information.

Note that the following processing is performed in a case where the chart paper CP read by the second image forming apparatus 102 is one generated by the second image forming apparatus 102.

In this case, the second image forming apparatus 102 determines that the image forming apparatus 100 used to generate the chart paper CP is the second image forming apparatus 102 on the basis of the apparatus identification information included in the code image KG formed on the chart paper CP.

Then, in this case, the second image forming apparatus 102 determines, for each chart paper CP, whether or not to transmit read image data without considering the transmission control information.

Specifically, in this case, the second image forming apparatus 102 determines whether or not to transmit read image data, for example, on the basis of only the presence or absence of a security code.

In this case, the second image forming apparatus 102 transmits read image data to the server apparatus 200 even in a case where information indicating that transmission is not permitted is included, as the transmission control information, in the code image KG. In a case where the image forming apparatus 100 used to read the chart paper CP is the second image forming apparatus 102, the troubles described above occurring due to a difference in apparatus do not occur.

In this case, the second image forming apparatus 102 transmits read image data to the server apparatus 200 even in a case where the code image KG given to the chart paper CP includes transmission control information indicating that transmission is not permitted.

Figure 8:
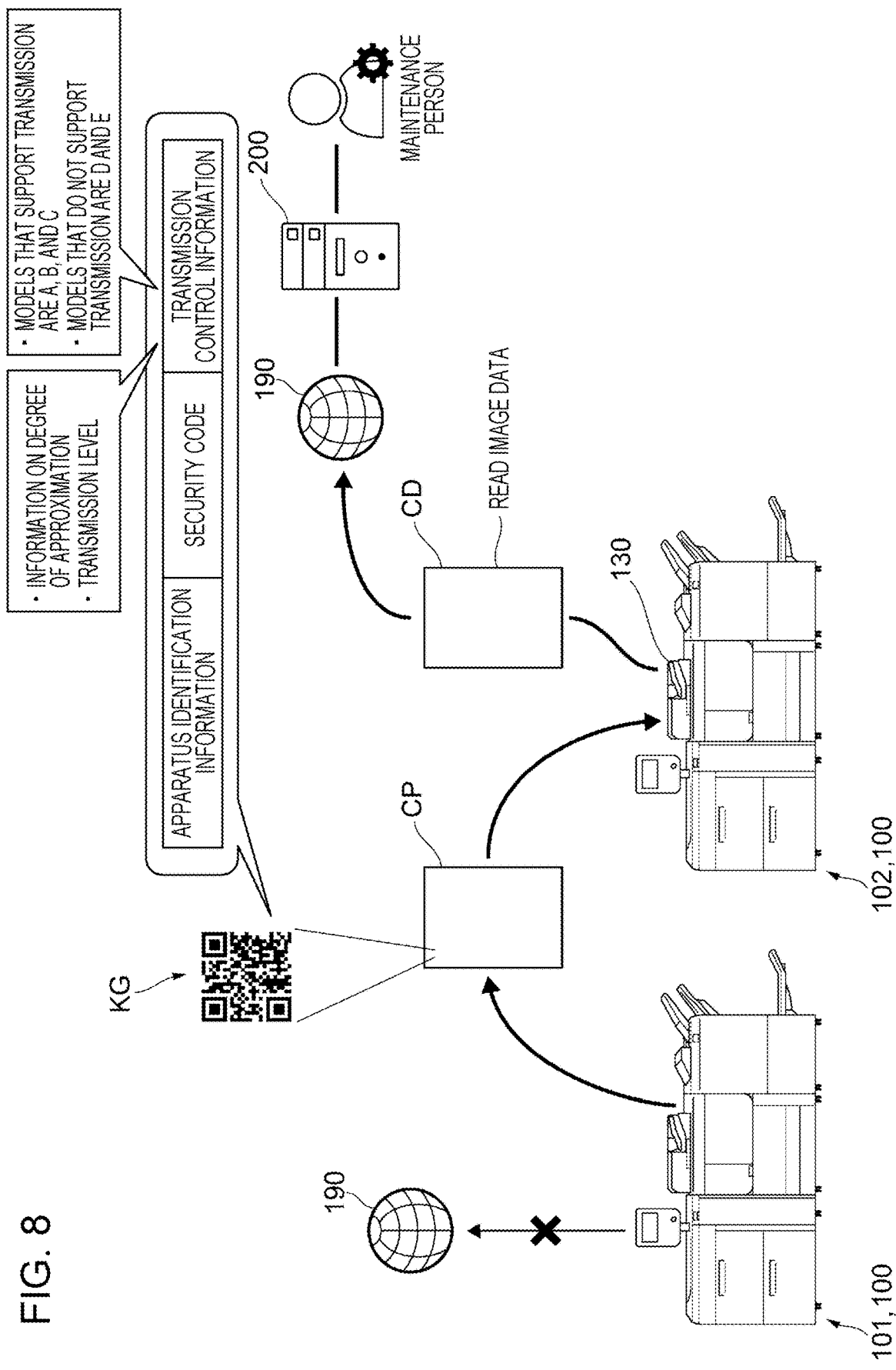
FIG. 8 illustrates another specific example of transmission control information included in a code image formed on chart paper.

FIG. 8 illustrates another specific example of transmission control information included in the code image KG formed on the chart paper CP.

In this example illustrated in FIG. 8, permitted apparatus information, which is information for specifying an image forming apparatus 100 permitted to transmit read image data to the server apparatus 200, is included, as the transmission control information, in the code image KG formed on each chart paper CP generated by the first image forming apparatus 101.

Specifically, in this processing example, the transmission control information includes, as the permitted apparatus information, information indicating that "models that support transmission are A, B, and C" and information indicating that "models that do not support transmission are D and E".

In other words, in this processing example, information for specifying an apparatus permitted to output a reading result is added, as the transmission control information, to the chart paper CP.

In the present exemplary embodiment, the second image forming apparatus 100 controls output of a reading result on the basis of the own apparatus information, the permitted apparatus information, and the like.

Furthermore, in this processing example, information concerning a degree of approximation of the first image forming apparatus 101 to each of the other image forming apparatuses 100 is included, as the transmission control information, in the code image KG formed on each chart paper CP generated by the first image forming apparatus 101.

Specifically, in this processing example, information indicating that a degree of approximation of the first image forming apparatus 101 to each of the apparatuses A and B is "2" is included as the information concerning a degree of approximation.

Furthermore, in this processing example, information indicating that a degree of approximation of the first image forming apparatus 101 to the apparatus C is "1" is included as the information concerning a degree of approximation.

Note that in this processing example, a higher degree of approximation indicates that the first image forming apparatus 101 is more approximate to another apparatus.

Furthermore, in this processing example, the information concerning the transmission level is included, as the transmission control information, in the code image KG formed on each chart paper CP.

Specifically, in this processing example, a transmission level that varies depending on a type of chart paper CP is added, as the transmission control information, to each chart paper CP.

Specifically, for example, the transmission level 0 is added, as the transmission control information, to chart paper CP that does not influence diagnosis of the first image forming apparatus 101 to be diagnosed irrespective of which image forming apparatus 100 is used to read the chart paper CP.

Furthermore, for example, the transmission level 1 is added, as the transmission control information, to chart paper CP that influences accuracy of diagnosis depending on the image forming apparatus 100 that reads the chart paper CP.

More specifically, for example, the transmission level 1 is added, as the transmission control information, to chart paper CP that does not influence accuracy of diagnosis in a case where the chart paper CP is read by an image forming apparatus 100 approximate to the first image forming apparatus 101 to be diagnosed, such as an image forming apparatus 100 having an apparatus configuration close to the first image forming apparatus 101 to be diagnosed but influences accuracy of diagnosis in a case where the chart paper CP is read by an image forming apparatus 100 that is not approximate to the first image forming apparatus 101 to be diagnosed.

Furthermore, for example, the transmission level 2 is added, as the transmission control information, to chart paper CP that influences accuracy of diagnosis of the first image forming apparatus 101 to be diagnosed irrespective of which image forming apparatus 100 is used to read the chart paper CP.

In other words, the transmission level 2 is added, as the transmission control information, to chart paper CP that influences accuracy of diagnosis of the first image forming apparatus 101 in a case where the chart paper CP is read by an image forming apparatus 100 other than the first image forming apparatus 101.

FIG. 9 illustrates a relationship between a transmission level and permission/non-permission of transmission. In other words, FIG. 9 illustrates a reference table to be referred to by the image forming apparatus 100 that reads chart paper CP and transmits read image data to the server apparatus 200.

In this processing example, for example, in a case where a chart image given the transmission level 1 is read by the apparatus A or the apparatus B, read image data of the chart image read by the apparatus A or the apparatus B is transmitted to the server apparatus 200, as indicated by the reference sign 9A.

In this case, the image forming apparatus 100 that reads the chart paper CP is an apparatus specified by the permitted apparatus information, and therefore a reading result is output to the server apparatus 200.

Note that in a case where a chart image given the transmission level 1 is read by the apparatus D or the apparatus E, the image forming apparatus 100 that reads the chart paper CP is not an apparatus specified by the permitted apparatus information, and therefore a reading result is not output to the server apparatus 200.

In this processing example, a degree of approximation of the apparatus A and the apparatus B to the first image forming apparatus 101 used to generate the chart paper CP given the transmission level 1 is 2.

This case is a case given a circle mark, as indicated by the reference sign 9A. In this case, read image data of the chart paper CP given the transmission level 1 generated by the first image forming apparatus 101 and read by the apparatus A or the apparatus B is transmitted from the apparatus A or the apparatus B to the server apparatus 200.

More specifically, in this case, first, the apparatus A or B acquires information concerning the transmission level, the permitted apparatus information, and the degree of approximation from the transmission control information added to the chart paper CP obtained by analyzing read image data obtained by reading the chart paper CP.

Then, in this case, the apparatus A or B determines that the apparatus A or B has a degree of approximation 2 with respect to the first image forming apparatus 101.

In this case, the apparatus A or B determines whether or not to transmit read image data of each chart paper CP to the server apparatus 200 on the basis of information registered in a column indicated by the reference sign 9C in the reference table and information concerning a transmission level added to the chart paper CP.

In this processing example, the apparatus A or B transmits read image data of chart paper CP given the transmission level 1 to the server apparatus 200.

Furthermore, the apparatus A or B also transmits read image data of chart paper CP given the transmission level 0 to the server apparatus 200.

On the other hand, the apparatus A or B does not transmit read image data of chart paper CP given the transmission level 2 to the server apparatus 200.

In this processing example, in a case where the image forming apparatus 100 that reads chart paper P is an apparatus specified by the permitted apparatus information, this image forming apparatus 100 decides contents of output to the server apparatus 200 on the basis of acquired information concerning a degree of approximation.

Specifically, for example, in a case where a degree of approximation specified by the information concerning a degree of approximation is 1, the image forming apparatus 100 outputs read image data of chart paper P given the transmission level 0, and does not output read image data of chart paper P given the transmission level 1 or the transmission level 2.

Furthermore, for example, in a case where a degree of approximation specified by the information concerning a degree of approximation is 2, the image forming apparatus 100 outputs read image data of chart paper P given the transmission level 0 or the transmission level 1 and does not output read image data of chart paper P given the transmission level 2.

In a case where the second image forming apparatus 102 illustrated in FIG. 8 is the apparatus A or B, the second image forming apparatus 102 transmits read image data of chart paper CP given the transmission level 1 or the transmission level 0 to the server apparatus 200. Furthermore, in a case where the second image forming apparatus 102 illustrated in FIG. 8 is the apparatus A or B, the second image forming apparatus 102 does not transmit read image data of chart paper CP given the transmission level 2 to the server apparatus 200.

Furthermore, in a case where the second image forming apparatus 102 illustrated in FIG. 8 is the apparatus C, the second image forming apparatus 102 transmits read image data of chart paper CP given the transmission level 0 to the server apparatus 200.

Furthermore, in a case where the second image forming apparatus 102 illustrated in FIG. 8 is the apparatus C, the second image forming apparatus 102 does not transmit read image data of chart paper CP given the transmission level 1 or the transmission level 2 to the server apparatus 200.

In this processing example, in a case where a reading property of the first image forming apparatus 101 used to generate chart paper CP and a reading property of the second image forming apparatus 102 used to read the chart paper CP are close, read image data of chart paper CP given the transmission level 1 is transmitted to the server apparatus 200.

On the other hand, in a case where a reading property of the first image forming apparatus 101 used to generate chart paper CP and a reading property of the second image forming apparatus 102 used to read the chart paper CP are far from each other, read image data of chart paper CP given the transmission level 1 is not transmitted to the server apparatus 200.

In a case where this processing is performed, even in a case where the first image forming apparatus 101 that generates chart paper CP and the second image forming apparatus 102 that reads the chart paper CP are different, read image data is transmitted to the server apparatus 200 in a case where these two image forming apparatuses 100 have apparatus configurations approximate to each other, for example, are in a family relationship.

Furthermore, in this processing example, read image data of chart paper CP given the transmission level 0 is transmitted from the second image forming apparatus 102 used to read the chart paper CP to the server apparatus 200 irrespective of a degree of approximation.

Furthermore, in this processing example, read image data of chart paper CP given the transmission level 2 is not transmitted from the second image forming apparatus 102 used to read the chart paper CP to the server apparatus 200 irrespective of a degree of approximation.

Read image data of chart paper CP given the transmission level 2 is transmitted to the server apparatus 200 only in a case where the image forming apparatus 100 used to generate the chart paper CP and the image forming apparatus 100 used to read the chart paper CP match each other, as indicated by the reference sign 9G of FIG. 9.

In the present exemplary embodiment, information for specifying the first image forming apparatus 101 used to generate chart paper CP is added to the chart paper CP as the apparatus identification information (see FIG. 8).

In the present exemplary embodiment, this apparatus identification information also serves as the transmission control information.

In the present exemplary embodiment, in a case where an apparatus specified by the apparatus identification information and the image forming apparatus 100 used to read the chart paper CP match each other, read image data of chart paper P given any transmission level including chart paper CP given the transmission level 2 is transmitted to the server apparatus 200.

In this case, the image forming apparatus 100 used to generate the chart paper CP reads the chart paper P, and therefore, read image data is transmitted to the server apparatus 200 irrespective of a transmission level.

Meanwhile, in the present exemplary embodiment, in a case where an apparatus specified by the apparatus identification information and the image forming apparatus 100 used to read the chart paper CP do not match each other, whether or not to output read image data from the image forming apparatus 100 used to read the chart paper CP is determined and contents of the output are decided on the basis of the permitted apparatus information, the information concerning a degree of approximation, and the information concerning a transmission level, as described above.

In a case where an apparatus specified by the apparatus identification information and the image forming apparatus 100 used to read the chart paper CP do not match each other, read image data of chart paper CP given the transmission level 2 is not output to the server apparatus 200 irrespective of whether or not the image forming apparatus 100 is an apparatus specified by the permitted apparatus information and irrespective of a degree of approximation.

Furthermore, as for read image data of chart paper CP given the transmission level 1, in a case where the image forming apparatus 100 is an apparatus specified by the permitted apparatus information and the degree of approximation is 2, the read image data is output to the server apparatus 200.

Furthermore, as for read image data of chart paper CP given the transmission level 1, in a case where the image forming apparatus 100 is an apparatus specified by the permitted apparatus information and the degree of approximation is 1, the read image data is not output to the server apparatus 200.

Furthermore, as for read image data of chart paper CP given the transmission level 0, in a case where the image forming apparatus 100 is an apparatus specified by the permitted apparatus information, the read image data is output to the server apparatus 200.

In the processing example illustrated in FIG. 7, whether or not to transmit read image data is determined on the basis of transmission control information including information indicating that transmission is not permitted or information indicating that transmission is permitted.

Meanwhile, in the processing example illustrated in FIGS. 8 and 9, whether or not to transmit read image data is determined in consideration of a relationship between the first image forming apparatus 101 and the second image forming apparatus 102.

In the processing example illustrated in FIG. 7, there arises a situation in which read image data is not transmitted even in a case where the first image forming apparatus 101 and the second image forming apparatus 102 have close apparatus configurations.

Meanwhile, in the processing example illustrated in FIGS. 8 and 9, read image data is transmitted to the server apparatus 200 in a case where the first image forming apparatus 101 and the second image forming apparatus 102 are approximate to each other, for example, in a family relationship.

In the present exemplary embodiment, apparatus identification information is also added to chart paper CP in addition to the transmission control information, as illustrated in FIG. 8.

More specifically, in the present exemplary embodiment, apparatus identification information, which is an example of apparatus specifying information for specifying the image forming apparatus 100 used to form a chart image on chart paper CP, is added to the chart paper CP.

In the present exemplary embodiment, the image forming apparatus 100 used to read chart paper CP acquires, as information added to the chart paper CP, apparatus identification information for specifying the image forming apparatus 100 used to form a chart image.

Then, the image forming apparatus 100 used to read the chart paper CP controls output of a reading result of the chart paper CP on the basis of own apparatus information, which is information concerning this image forming apparatus 100, and the apparatus identification information.

Specifically, in a case where an apparatus specified by the own apparatus information and an apparatus specified by the apparatus identification information match each other, the image forming apparatus 100 used to read the chart paper CP outputs a reading result of the chart paper CP.

In this case, as described above, the image forming apparatus 100 used to generate the chart paper CP reads the chart paper P.

In this case, the image forming apparatus 100 used to read chart paper CP outputs a reading result of the chart paper CP irrespective of a transmission level, as indicated by the reference sign 9X in FIG. 9.

Meanwhile, in a case where an apparatus specified by the own apparatus information and an apparatus specified by the apparatus identification information do not match each other, the image forming apparatus 100 used to read chart paper CP outputs a reading result in a case where another predetermined condition is satisfied and does not output a reading result in a case where the other predetermined condition is not satisfied.

Specifically, in this case, the image forming apparatus 100 used to read the chart paper CP acquires the permitted apparatus information, the information concerning a degree of approximation, and the information concerning a transmission level, as described above.

Then, this image forming apparatus 100 determines whether or not the apparatus specified by the own apparatus information is an apparatus specified by the permitted apparatus information.

Then, in a case where the apparatus specified by the own apparatus information is an apparatus specified by the permitted apparatus information, the image forming apparatus 100 controls output of a reading result on the basis of the information concerning a degree of approximation and the information concerning a transmission level.

Specifically, in this case, for example, in a case where the image forming apparatus 100 determines that this image forming apparatus 100 is A or B, which is the transmission support model, the degree of approximation is 2, and therefore a reading result of chart paper CP given the transmission level 0 or the transmission level 1 is output.

Meanwhile, for example, in a case where the image forming apparatus 100 determines that this image forming apparatus 100 is C, which is the transmission support model, the degree of approximation is 1, and therefore a reading result of only chart paper CP given the transmission level 0 is output.

In the present exemplary embodiment, even in a case where a degree of approximation of the image forming apparatus 100 used to read chart paper CP is 2, a reading result is not output in a case where a type specified by the type information is a specific type.

Specifically, a reading result of chart paper CP given the transmission level 2 is not output even in a case where a degree of approximation of the image forming apparatus 100 used to read the chart paper CP is 2.

A reading result of chart paper CP given the transmission level 2 is output only in a case where the image forming apparatus 100 used to generate the chart paper CP and the image forming apparatus 100 used to read the chart paper CP match each other.

Processing during Reading of Chart Paper CP in Second Image Forming Apparatus 102

FIG. 10 is a view for explaining details of processing performed when chart paper CP is read by the second image forming apparatus 102.

In the present exemplary embodiment, the second image forming apparatus 102 reads paper P generated by the second image forming apparatus 102 itself as needed in addition to chart paper CP generated by the first image forming apparatus 101.

Specifically, in the present exemplary embodiment, first, as described above, the second image forming apparatus 102 reads chart paper CP generated by the first image forming apparatus 101, as indicated by the reference sign 10A.

After reading the chart paper CP, the second image forming apparatus 102 determines whether or not the image forming apparatus 100 used to generate the chart paper CP is different from the second image forming apparatus 102.

In other words, the second image forming apparatus 102 determines whether or not the image forming apparatus 100 used to generate the chart paper CP is the second image forming apparatus 102 itself.

Then, in a case where the second image forming apparatus 102 determines that the image forming apparatus 100 used to generate the chart paper CP is different from the second image forming apparatus 102, the second image forming apparatus 102 generates paper P on which an image is formed.

Specifically, in this case, the second image forming apparatus 102 generates paper for own apparatus PJ, which is paper P used for diagnosis of the second image forming apparatus 102.

This paper for own apparatus PJ is paper whose one surface has a blank part 91, a colored image (hereinafter referred to as a "colored image part 92"), and a code image KG formed thereon and whose other surface has no image thereon and is blank.

Then, the second image reading device 130 causes information indicative of an instruction to read the paper for own apparatus PJ to be displayed on the operation receiving unit 132 of the second image forming apparatus 102, as indicated by the reference sign 10B.

Then, the user places the paper for own apparatus PJ in the image reading device 130 of the second image forming apparatus 102, and the second image forming apparatus 102 reads the paper for own apparatus PJ.

The second image forming apparatus 102 reads not only an image on the one surface of the paper for own apparatus PJ, but also an image on the other surface of the paper for own apparatus PJ. In other words, the second image forming apparatus 102 reads images on both surfaces of the paper for own apparatus PJ.

Note that in a case where the image reading device 130 is provided inside the second image forming apparatus 102, images on both surfaces of the paper for own apparatus PJ are automatically read.

Next, the second image forming apparatus 102 transmits read image data obtained by reading the chart paper CP and read image data obtained by reading the paper for own apparatus PJ to the server apparatus 200, as indicated by the reference sign 10E.

The second image forming apparatus 102 transmits, as the read image data obtained by reading the paper for own apparatus PJ, read image data obtained by reading the one surface of the paper for own apparatus PJ and read image data obtained by reading the other surface of the paper for own apparatus PJ to the server apparatus 200.

Furthermore, the second image forming apparatus 102 transmits apparatus identification information of the second image forming apparatus 102 to the server apparatus 200 separately from the read image data.

In this case, the second image forming apparatus 102 transmits this apparatus identification information to the server apparatus 200, for example, as text data.

Note that hereinafter, read image data obtained by reading chart paper CP is sometimes referred to as "chart image data CD".

Furthermore, hereinafter, the read image data obtained by reading the one surface of the paper for own apparatus PJ is sometimes referred to as "image formation surface data GD", and the read image data obtained by reading the other surface of the paper for own apparatus PJ is sometimes referred to as "blank surface data HD".

The server apparatus 200 determines whether or not apparatus identification information stored in the code image KG included in the image formation surface data GD matches the apparatus identification information included in the text data transmitted separately from the read image data by analyzing the image formation surface data GD transmitted from the second image forming apparatus 102.

In this processing example, these pieces of apparatus identification information match each other. In this case, the server apparatus 200 recognizes that the read image data obtained by reading the paper for own apparatus PJ is included in the read image data transmitted from the second image forming apparatus 102.

Next, the server apparatus 200 diagnoses the first image forming apparatus 101 and the second image forming apparatus 102 by analyzing the chart image data CD, the image formation surface data GD, and the blank surface data HD.

Then, in the present exemplary embodiment, a result of the diagnosis is displayed on a display unit 300 referred to by the maintenance person, as indicated by the reference sign 10F in FIG. 10.

In a case where the server apparatus 200 determines that the first image forming apparatus 101 has a trouble, the server apparatus 200 causes information concerning the trouble of the first image forming apparatus 101 to be displayed on the display unit 300 referred to by the maintenance person.

In other words, in this case, the server apparatus 200 generates a display screen on which the information concerning the trouble of the first image forming apparatus 101 is displayed, outputs information concerning this display screen to the display unit 300 referred to by the maintenance person, and thus causes the display screen to be displayed on the display unit 300.

Furthermore, in a case where the server apparatus 200 determines that the second image forming apparatus 102 has a trouble, the server apparatus 200 causes information concerning the trouble of the second image forming apparatus 102 to be displayed on the display unit 300 referred to by the maintenance person.

Specifically, also in this case, the server apparatus 200 generates a display screen on which the information concerning the trouble of the second image forming apparatus 102 is displayed, outputs information concerning this display screen to the display unit 300 referred to by the maintenance person, and thus causes the display screen to be displayed on the display unit 300.

For example, in a case where the chart image data CD has a streak and the image formation surface data GD and the blank surface data HD also have a streak, and these streaks are located at the same position, it is determined that the image reading device 130 of the second image forming apparatus 102 has a trouble.

In this case, the server apparatus 200 generates a display screen including information indicating that the image reading device 130 of the second image forming apparatus 102 has a trouble.

Furthermore, for example, in a case where the chart image data CD and the blank surface data HD have no streak and the image formation surface data GD has a streak, the server apparatus 200 generates a display screen including information indicating that the image forming unit 100A of the second image forming apparatus 102 has a trouble.

Furthermore, for example, in a case where the chart image data CD has a streak and the image formation surface data GD and the blank surface data HD have no streak, the server apparatus 200 generates a display screen including information indicating that the image forming unit 100A of the first image forming apparatus 101 has a trouble.

Furthermore, in a case where none of the chart image data CD, the image formation surface data GD, and the blank surface data HD has a streak, the server apparatus 200 generates a display screen including information indicating that none of the first image forming apparatus 101 and the second image forming apparatus 102 has a trouble.

Display Screen Displayed on Display Unit 300

Figure 11:
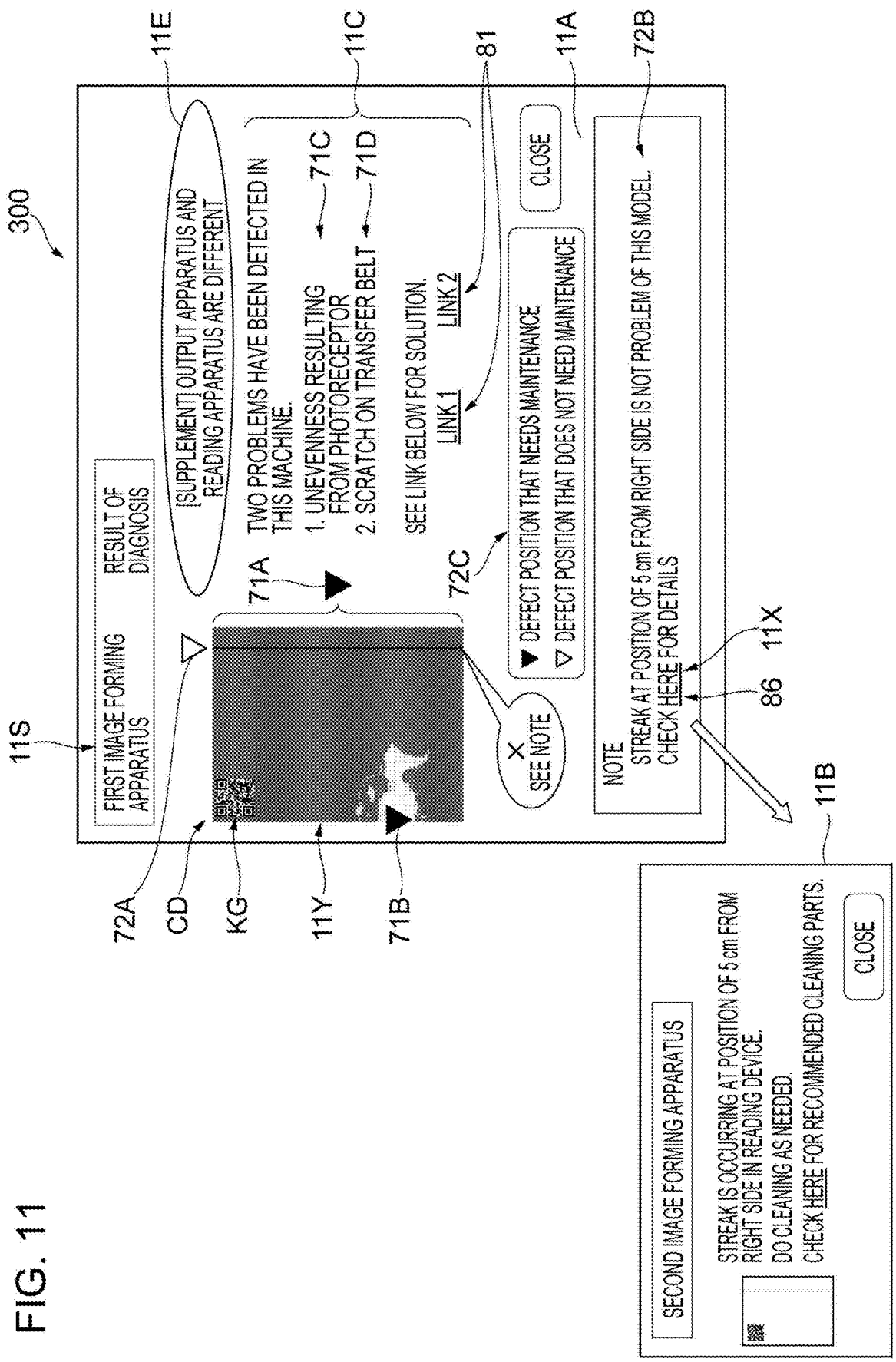
FIG. 11 illustrates an example of the display screen generated by the server apparatus.

FIG. 11 illustrates an example of the display screen generated by the server apparatus 200.

In the present exemplary embodiment, this display screen is transmitted from the server apparatus 200 to the display unit 300 referred to by the maintenance person, and is then displayed on the display unit 300. More specifically, the display screen is transmitted from the server apparatus 200 to a terminal apparatus operated by the maintenance person, and is then displayed on the display unit 300 provided in this terminal apparatus.

In a case where the first image forming apparatus 101 to be diagnosed and the second image forming apparatus 102 used to read chart paper CP are different as in the present exemplary embodiment, there is a possibility that the maintenance person who maintains the first image forming apparatus 101 does maintenance of the second image forming apparatus 102 different from the first image forming apparatus 101 which the maintenance person should maintain.

In some cases, the chart image data CD, which is read image data of chart paper CP, is influenced by a trouble of the image reading device 130 of the second image forming apparatus 102 used to read the chart paper CP. In such cases, there is a possibility that the maintenance person erroneously recognizes that this trouble is occurring in the first image forming apparatus 101 used to generate the chart paper CP.

In this respect, in the present exemplary embodiment, occurrence of the trouble such as the erroneous recognition is suppressed by performing the following processing.

In the present exemplary embodiment, the server apparatus 200 generates a display screen indicated by the reference sign 11A in FIG. 11 upon detection of a trouble and causes this display screen to be displayed on the display unit 300 referred to by the maintenance person.

On this display screen indicated by the reference sign 11A in FIG. 11, the chart image data CD in which a trouble is appearing is displayed at a position indicated by the reference sign 11Y.

Furthermore, on this display screen, a diagnosis result concerning a trouble of the first image forming apparatus 101 is displayed at a position indicated by the reference sign 11C.

Furthermore, this display screen includes, at a position indicated by the reference sign 11S, information for specifying the first image forming apparatus 101, which is an example of a diagnosed image forming apparatus.

In this processing example, a trouble is also occurring in the second image forming apparatus 102 as described later, but information for specifying the second image forming apparatus 102 is not displayed at all on this display screen on which the information concerning the trouble of the first image forming apparatus 101 is displayed.

In other words, in this processing example, information for specifying the second image forming apparatus 102 is not included in the display screen indicated by the reference sign 11A on which the information concerning the trouble of the first image forming apparatus 101 is displayed.

As a result, the maintenance person is less likely to erroneously recognize that a maintenance target is the second image forming apparatus 102.

On the display screen indicated by the reference sign 11A, a selection part 81 for displaying more detailed information concerning a trouble is displayed in association with each trouble of the first image forming apparatus 101.

In the present exemplary embodiment, when the maintenance person selects this selection part 81, information concerning how to cope with the trouble is further displayed.

Furthermore, on this display screen indicated by the reference sign 11A, information indicating that an apparatus used to generate chart paper CP and an apparatus used to read the chart paper CP are different is displayed, as indicated by the reference sign 11E.

In the present exemplary embodiment, by displaying this information, the maintenance person is alerted that the maintenance person may erroneously recognize a maintenance target apparatus.

The server apparatus 200 specifies the image forming apparatus 100 used to generate the chart paper CP by analyzing the code image KG included in the chart image data CD.

Furthermore, the server apparatus 200 specifies the image forming apparatus 100 used to read the chart paper CP by analyzing the apparatus identification information transmitted as text information and the code image KG included in the image formation surface data GD.

Then, in a case where the image forming apparatus 100 used to generate the chart paper CP and the image forming apparatus 100 used to read the chart paper CP are different, the server apparatus 200 causes information indicating that the apparatus used to generate the chart paper CP and the apparatus used to generate the chart paper CP are different to be included in the display screen, as described above.

In this processing example, the server apparatus 200 acquires other apparatus information, which is information concerning the other image forming apparatus 100 used to read the chart paper CP that is different from the image forming apparatus 100 used to generate the chart paper CP.

Specifically, in this processing example, the server apparatus 200 acquires, as the other apparatus information, information for specifying the second image forming apparatus 102.

In this processing example, the first image forming apparatus 101 generates the chart paper CP, and the second image forming apparatus 102 reads the chart paper CP, and therefore the server apparatus 200 acquires, as the other apparatus information, information for specifying the second image forming apparatus 102.

In this case, the server apparatus 200 causes information indicating that the apparatus used to generate the chart paper CP and the apparatus used to read the chart paper CP to be included in the display screen, as described above.

In the present exemplary embodiment, the image forming apparatus 100 used to generate the chart paper CP is the first image forming apparatus 101, and the image forming apparatus 100 used to read the chart paper CP is the second image forming apparatus 102.

In this case, information indicating that the apparatus used to generate the chart paper CP and the apparatus used to read the chart paper CP are different is included in the display screen.

In this processing example, information concerning the second image forming apparatus 102 is substantially included in this information indicating that the apparatus used to generate the chart paper CP and the apparatus used to read the chart paper CP are different, and the information concerning the second image forming apparatus 102 is, which is an example of the other apparatus information, is thus included in the display screen indicated by the reference sign 11A in the present exemplary embodiment.

On the display screen indicated by the reference sign 11A, information concerning unevenness resulting from a photoreceptor and a scratch on a transfer belt is displayed as information concerning a trouble occurring in the first image forming apparatus 101, as indicated by the reference sign 71A, 71B, 71C, or 71D.

Furthermore, on this display screen, information indicating that a trouble is occurring but this trouble is not occurring due to the first image forming apparatus 101 is displayed, as indicated by the reference sign 72A, 72B, or 72C.

Specifically, a vertical streak indicated by the reference sign 72A is a trouble occurring due to the second image forming apparatus 102, and information indicating that this vertical streak is not a trouble occurring due to the first image forming apparatus 101 is displayed.

In this display example, when the maintenance person selects a selection part 86 indicated by the reference sign 11X, an image 11B is displayed in addition to the display screen indicated by the reference sign 11A.

Then, in this display example, information concerning the second image forming apparatus 102 is displayed for the first time in this image 11B, which is an example of an additional image. In other words, the information for specifying the second image forming apparatus 102 is included in the image 11B, and the information for specifying the second image forming apparatus 102 is displayed for the first time by displaying the image 11B.

Information indicating that a cause of the trouble lies in the second image forming apparatus 102 is included in the image 11B. In other words, information specifically specifying the second image forming apparatus 102 that has caused the trouble is included in the image 11B.

Furthermore, a result of diagnosis of the second image forming apparatus 102 is included in the image 11B. Furthermore, information for specifying the first image forming apparatus 101 is not included in the image 11B.

Although a case where the image 11B is additionally displayed has been described as an example, another display screen may be displayed instead of the display screen indicated by the reference sign 11A, and the information for specifying the second image forming apparatus 102 and the result of the diagnosis of the second image forming apparatus 102 may be included in the other display screen.

In other words, the display screen may be switched to another display screen different from the display screen indicated by the reference sign 11A, and the information for specifying the second image forming apparatus 102 and the result of the diagnosis of the second image forming apparatus 102 may be included in the other display screen.

Information concerning a status of the trouble and how to address the trouble is displayed in the image 11B.

In the present exemplary embodiment, the information for specifying the second image forming apparatus 102 is not displayed on the display screen displayed earlier indicated by the reference sign 11A.

In the present exemplary embodiment, the information for specifying the second image forming apparatus 102 and detailed information of the trouble occurring due to the second image forming apparatus 102 are displayed when the user performs a predetermined specific operation, for example, when the user performs an operation of selecting a part of this display screen displayed earlier.

In the present exemplary embodiment, when the maintenance person selects a part of the display screen, the information for specifying the second image forming apparatus 102 and details of the trouble occurring due to the second image forming apparatus 102 are displayed, as described above.

In the present exemplary embodiment, the information for specifically specifying the second image forming apparatus 102 and details of the trouble occurring due to the second image forming apparatus 102 are not displayed unless the user performs a specific operation, as described above. As a result, in the present exemplary embodiment, the maintenance person is less likely to erroneously do maintenance of the second image forming apparatus 102.

Meanwhile, in the present exemplary embodiment, the information concerning the second image forming apparatus 102 is displayed when the maintenance person performs a specific operation such as an operation of selecting a part of the display screen, as described above. This allows the maintenance person to also cope with the trouble of the second image forming apparatus 102.

In the present exemplary embodiment, since the information concerning the second image forming apparatus 102 is also displayed on the display screen, not only the read image data, but also the apparatus identification information for specifying the second image forming apparatus 102 are also transmitted from the second image forming apparatus 102 to the server apparatus 200.

Note that on the display screen indicated by the reference sign 11A in FIG. 11, an image corresponding to a trouble is displayed on the chart image data CD as indicated by the reference signs 71A, 71B, and 72A, and thereby a position of the trouble is indicated.

However, this is not restrictive, and a position of a trouble occurring due to the first image forming apparatus 101 and a trouble occurring due to the second image forming apparatus 102 may be indicated by displaying position information indicative of the positions of the troubles as numerical values, as illustrated in FIG. 12, which illustrates another example of a display screen.

Description of Paper for Own Apparatus PJ

Figure 13A:
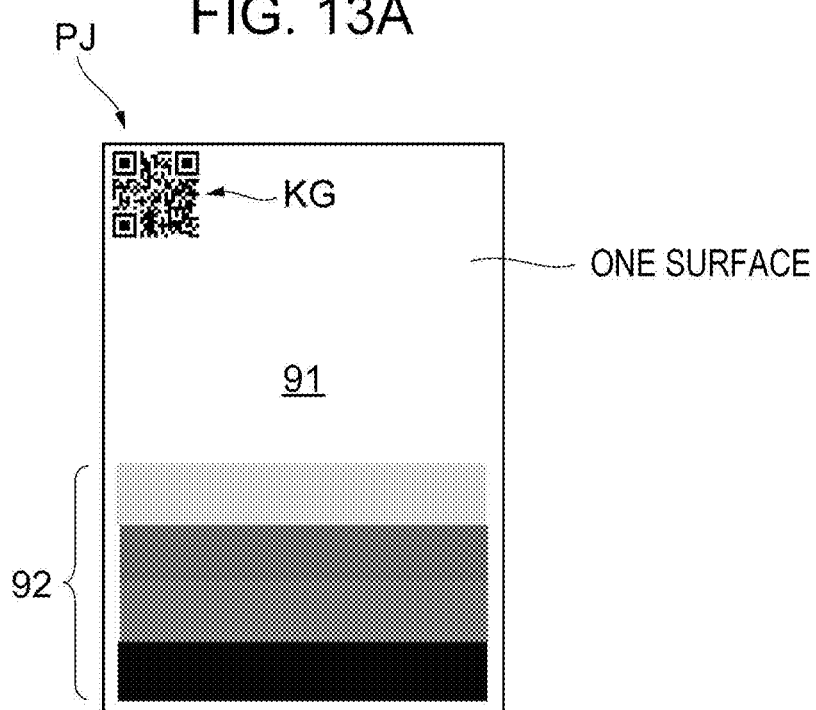
FIGS. 13A and 13B illustrates paper for own apparatus generated by the second image forming apparatus.
Figure 13B:
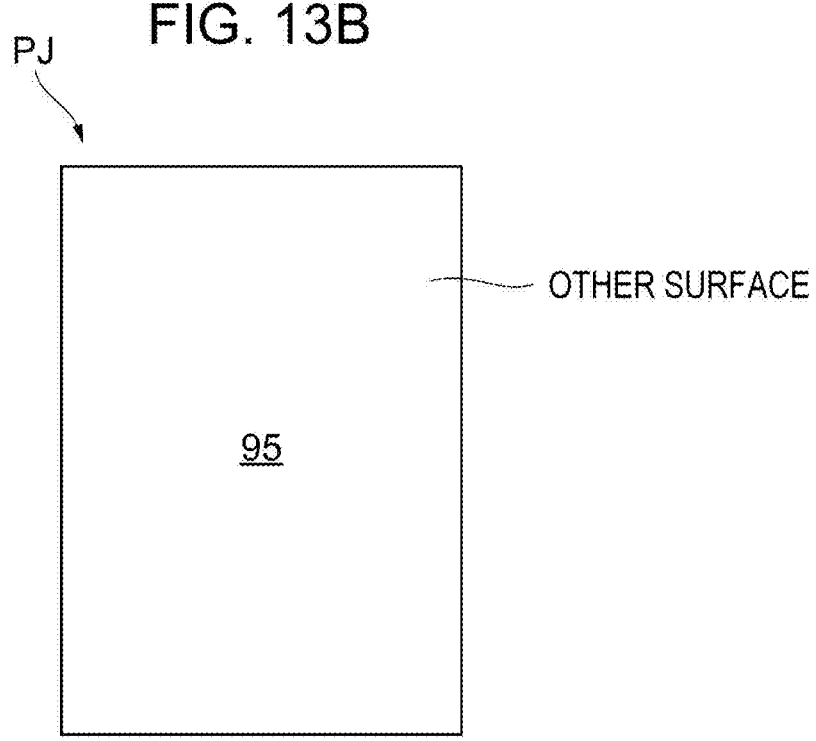

FIGS. 13A and 13B illustrates the paper for own apparatus PJ generated by the second image forming apparatus 102.

As illustrated in FIG. 13A, the code image KG, the blank part 91, and the colored image part 92 are formed on one surface of the paper for own apparatus PJ, as described above.

The code image KG includes the apparatus identification information for specifying the second image forming apparatus 102, as described above.

In the present exemplary embodiment, the server apparatus 200 compares this apparatus identification information included in the code image KG and the apparatus identification information transmitted from the second image forming apparatus 102 separately from the read image data, as described above. In this way, the server apparatus 200 detects the paper for own apparatus PJ.

The blank part 91 on the one surface of the paper for own apparatus PJ is used to detect a trouble of the image reading device 130 provided in the second image forming apparatus 102 and a color streak occurring due to the image forming unit 100A provided in the second image forming apparatus 102.

The colored image part 92 on the one surface of the paper for own apparatus PJ is used to detect a trouble of the image reading device 130 provided in the second image forming apparatus 102 and a white streak occurring due to a trouble of the image forming unit 100A provided in the second image forming apparatus 102.

Meanwhile, the other surface of the paper for own apparatus PJ is not influenced by the image forming unit 100A of the second image forming apparatus 102, and the other surface is a blank part 95, as illustrated in FIG. 13B.

The other surface of the paper for own apparatus PJ passes the image forming unit 100A while facing a side opposite to a side where the image forming unit 100A (see FIG. 3) of the second image forming apparatus 102 is provided. Accordingly, toner or ink used for formation of an image by the image forming unit 100A is not attached to the other surface.

The one surface of the paper for own apparatus PJ passes the image forming unit 100A while facing the image forming unit 100A of the second image forming apparatus 102.

Accordingly, in a case where the blank part 91 of the image formation surface data GD, which is read image data obtained by reading the one surface, has a streak, it is determined that a cause of this streak lies in the image reading device 130 of the second image forming apparatus 102 or the image forming unit 100A of the second image forming apparatus 102.

Meanwhile, the other surface of the paper for own apparatus PJ does not pass the image forming unit 100A while facing the image forming unit 100A, as described above. Accordingly, a color streak occurring due to the image forming unit 100A does not occur on the other surface of the paper for own apparatus PJ.

In a case where the blank surface data HD, which is read image data obtained by reading the other surface of the paper for own apparatus PJ, has a streak, it is determined that a cause of this streak lies in the image reading device 130 of the second image forming apparatus 102.

Description of Flow of Processing

A flow of the processing will be described again although the following description partially overlaps the above description.

In the present exemplary embodiment, first, the first image forming apparatus 101 generates chart paper CP having a code image KG, as illustrated in FIG. 7 or 8.

The code image KG includes apparatus identification information for specifying the first image forming apparatus 101 and a security code used to determine whether to permit transmission. Furthermore, the code image KG includes transmission control information used for control of transmission of read image data.

Next, the user places the chart paper CP in the second image forming apparatus 102 to read the chart paper CP, as illustrated in FIG. 7 or 8. In this way, the second image forming apparatus 102 acquires chart image data CD, which is read image data of the chart paper CP.

Next, the second image forming apparatus 102 determines whether or not the information included in the code image KG included in the chart image data CD includes a security code registered in advance.

Furthermore, the second image forming apparatus 102 acquires the apparatus identification information from the code image KG. Then, the second image forming apparatus 102 determines whether or not the chart paper CP is chart paper CP generated by the second image forming apparatus 102 on the basis of the acquired apparatus identification information.

In a case where the second image forming apparatus 102 determines that the chart paper CP is not one generated by the second image forming apparatus 102, the second image forming apparatus 102 generates paper for own apparatus PJ, as illustrated in FIG. 10.

The blank part 91, the colored image part 92, and the code image KG are formed on one surface of the paper for own apparatus PJ, as described above.

Next, the second image forming apparatus 102 outputs information indicative of an instruction to read the paper for own apparatus PJ, as indicated by the reference sign 10B in FIG. 10. In this way, the paper for own apparatus PJ is placed in the image reading device 130 of the second image forming apparatus 102 by the user, and the paper for own apparatus PJ is read.

In this process, both surfaces of the paper for own apparatus PJ are read by the second image forming apparatus 102.

Specifically, in the second image forming apparatus 102, after an image on the one surface of the paper for own apparatus PJ is read, the paper for own apparatus PJ is reversed and is fed to an image reading position again, and then the other surface of the paper for own apparatus PJ is read.

In this way, the image formation surface data GD and the blank surface data HD are generated.

Next, the second image forming apparatus 102 (see FIG. 10) transmits the chart image data CD, which is read image data of the chart paper CP, and the image formation surface data GD and the blank surface data HD, which are read image data of the paper for own apparatus PJ, to the server apparatus 200.

Furthermore, the second image forming apparatus 102 transmits apparatus identification information of the second image forming apparatus 102 to the server apparatus 200 separately from the read image data, as described above.

In the present exemplary embodiment, the second image forming apparatus 102 transmits this apparatus identification information to the server apparatus 200 as text data.

Next, in this processing example, the server apparatus 200 (see FIG. 10) determines whether or not apparatus identification information obtained from the code image KG included in each of the read image data transmitted from the second image forming apparatus 102 and the apparatus identification information included in the text data match each other.

In a case where the server apparatus 200 determines that these pieces of apparatus identification information match each other, the server apparatus 200 determines whether a trouble is occurring on the basis of not only the chart image data CD, which is read image data of the chart paper CP, but also the image formation surface data GD and the blank surface data HD, which are read image data of the paper for own apparatus PJ.

In the present exemplary embodiment, chart paper CP generated by another image forming apparatus 100 (hereinafter referred to as a "third image forming apparatus 100") different from the first image forming apparatus 101 and the second image forming apparatus 102 may be read by the second image forming apparatus 102 together with the chart paper CP generated by the first image forming apparatus 101.

In this case, read image data of the chart paper CP generated by the third image forming apparatus 100 is also transmitted to the server apparatus 200. In this case, the paper for own apparatus PJ generated by the second image forming apparatus 102 cannot be specified.

In view of this, in this processing example, the apparatus identification information is transmitted from the second image forming apparatus 102 to the server apparatus 200 separately from the read image data of the paper for own apparatus PJ, as described above.

Then, in this case, the server apparatus 200 specifies, as the paper for own apparatus PJ, chart paper CP having the code image KG in which the apparatus identification information transmitted separately from the read image data of the paper for own apparatus PJ is stored. In this way, in the present exemplary embodiment, the server apparatus 200 specifies the paper for own apparatus PJ.

In a case where the image formation surface data GD and the blank surface data HD are also transmitted from the second image forming apparatus 102, the server apparatus 200 determines not only whether or not a trouble is occurring in the first image forming apparatus 101, but also whether or not a trouble is occurring in the second image forming apparatus 102.

Then, in a case where the server apparatus 200 determines that a trouble is occurring in the second image forming apparatus 102, the server apparatus 200 also causes information about the trouble of the second image forming apparatus 102 to be displayed on the display screen referred to by the maintenance person or the image 11B additionally displayed, as described above.

Specific Example of Determination of Trouble

A specific example of determination of a trouble by the server apparatus 200 will be described below.

For example, in a case where the chart image data CD, the image formation surface data GD, and the blank surface data HD have a streak at the same position, the server apparatus 200 determines that the image reading device 130 of the second image forming apparatus 102 has a trouble.

Furthermore, in a case where the chart image data CD and the blank surface data HD have no streak and the image formation surface data GD has a streak in the blank part 91, the server apparatus 200 determines that the image forming unit 100A of the second image forming apparatus 102 has a trouble.

It is also assumed that the image forming unit 100A of the second image forming apparatus 102 has a trouble. In this case, the chart image data CD has no streak, and the image formation surface data GD has a streak.

In this case, the server apparatus 200 determines that the image forming unit 100A of the second image forming apparatus 102 has a trouble.

FIG. 14 illustrates a specific example of the chart image data CD, the image formation surface data GD, and the blank surface data HD.

Note that FIG. 14 illustrates a specific example in a case where there are front surface side chart image data CD1 and back surface side chart image data CD2 as the chart image data CD.

More specifically, FIG. 14 illustrates a specific example in a case where the first image forming apparatus 101 forms an image on both of one surface and the other surface of paper P to generate chart paper CP.

More specifically, FIG. 14 illustrates a specific example in a case where the first image forming apparatus 101 forms an image for diagnosis on one surface of paper P and then forms only a code image KG on the other surface of the paper P after reversing the paper P to generate chart paper CP.

Note that the back surface side chart image data CD2 is not necessarily needed, and only the front surface side chart image data CD1 may be generated as the chart image data CD.

In a case where the back surface side chart image data CD2 is also generated, more data can be used for determination and accuracy of determination about a trouble is improved as compared with a case where only the front surface side chart image data CD1 is used.

In the example illustrated in FIG. 14, the front surface side chart image data CD1 and the back surface side chart image data CD2 each have two streaks. Of the two streaks, a color streak SJ1 on the left side is seen only in the chart image data CD and is not seen in the image formation surface data GD and the blank surface data HD.

In this case, the server apparatus 200 determines that the color streak SJ1 on the left side is a streak occurring due to the image forming unit 100A of the first image forming apparatus 101.

Then, in this case, the server apparatus 200 determines that the image forming unit 100A of the first image forming apparatus 101 has a trouble.

Furthermore, of the two streaks of each of the front surface side chart image data CD1 and the back surface side chart image data CD2, a color streak SJ2 on the right side is also seen in the image formation surface data GD and the blank surface data HD.

In this case, the server apparatus 200 determines that this color streak SJ2 is a streak occurring due to the image reading device 130 provided in the second image forming apparatus 102.

In this case, the server apparatus 200 determines that the image reading device 130 of the second image forming apparatus 102 has a trouble.

In a case where a streak occurs due to the image reading device 130 of the second image forming apparatus 102, the streak also appears in the blank surface data HD. In this case, the server apparatus 200 determines that the image reading device 130 provided in the second image forming apparatus 102 has a trouble.

Then, the server apparatus 200 generates a display screen illustrated in FIG. 11 on the basis of a result of the determination.

In the present exemplary embodiment, the server apparatus 200 thus acquires a result of diagnosis of the second image forming apparatus 102 in addition to a result of diagnosis of the first image forming apparatus 101.

In the present exemplary embodiment, an image formed on another paper P different from the chart paper CP by the second image forming apparatus 102 is read by this second image forming apparatus 102.

In other words, in the present exemplary embodiment, the paper for own apparatus PJ generated by forming the colored image part 92 and others on another paper P different from the chart paper CP is read by the second image forming apparatus 102.

Then, in the present exemplary embodiment, the server apparatus 200 or the maintenance person who refers to the read image data and others stored in the server apparatus 200 diagnoses the second image forming apparatus 102 on the basis of a reading result obtained by this reading by the second image forming apparatus 102. Then, the server apparatus 200 acquires a result of this diagnosis.

Then, in the present exemplary embodiment, the server apparatus 200 generates a display screen illustrated in FIG. 11 on the basis of a result of diagnosis of the first image forming apparatus 101 and a result of diagnosis of the second image forming apparatus 102.

Figure 15:
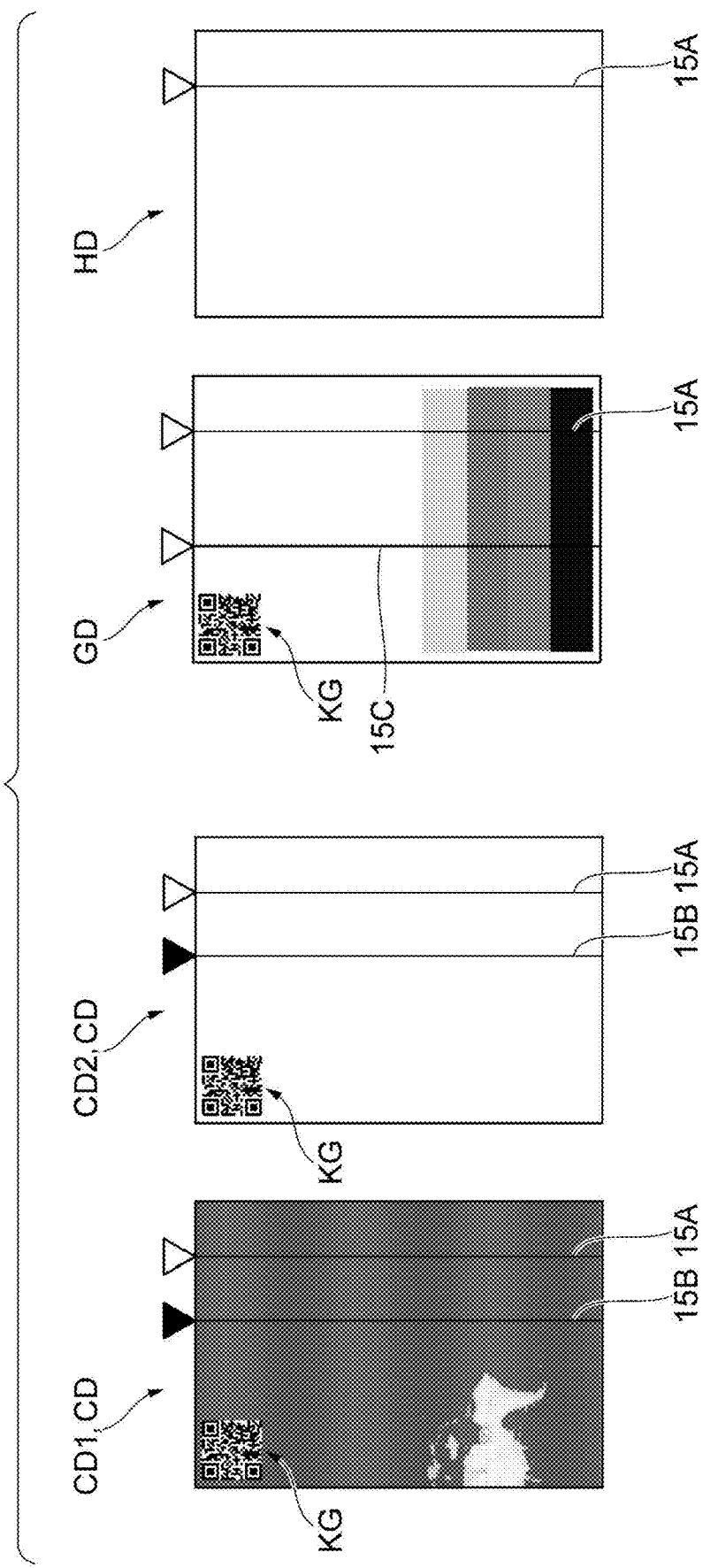
FIG. 15 illustrates another specific example of the chart image data, the image formation surface data, and the blank surface data.

FIG. 15 illustrates another specific example of the chart image data CD, the image formation surface data GD, and the blank surface data HD.

In this specific example, three kinds of streaks are occurring, as indicated by the reference signs 15A, 15B, and 15C.

Of the three kinds of streaks, a streak indicated by the reference sign 15A is seen in the front surface side chart image data CD1, the back surface side chart image data CD2, the image formation surface data GD, and the blank surface data HD. Therefore, the server apparatus 200 determines that this streak is a streak occurring due to the image reading device 130 of the second image forming apparatus 102.

In this case, the server apparatus 200 determines that the image reading device 130 provided in the second image forming apparatus 102 has a trouble.

Furthermore, a streak indicated by the reference sign 15B is seen only in the front surface side chart image data CD1 and the back surface side chart image data CD2, and therefore the server apparatus 200 determines that this streak is a streak occurring due to the image forming unit 100A of the first image forming apparatus 101.

In this case, the server apparatus 200 determines that the image forming unit 100A of the first image forming apparatus 101 has a trouble.

Furthermore, a streak indicated by the reference sign 15C is seen only in the image formation surface data GD.

In this case, the server apparatus 200 determines that this streak is a streak occurring due to the image forming unit 100A of the second image forming apparatus 102. In this case, the server apparatus 200 determines that the image forming unit 100A of the second image forming apparatus 102 has a trouble.

Then, the server apparatus 200 generates a display screen illustrated in FIG. 11 on the basis of a result of the determination.

FIG. 16 illustrates a relationship between a streak that occurs and a cause.

In the present exemplary embodiment, in a case where a color streak occurs and this color streak occurs in the chart image data CD, the image formation surface data GD, and the blank surface data HD as indicated by the case A, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

The streak indicated by the reference sign SJ2 in FIG. 14 is a streak that matches the condition indicated by the case A, and in a case where the streak indicated by the reference sign SJ2 in FIG. 14 occurs, the server apparatus 200 determines that the image reading device 130 of the second image forming apparatus 102 has a trouble.

Furthermore, the streak indicated by the reference sign 15A in FIG. 15 is also a streak that matches the condition indicated by the case A, and in a case where the streak indicated by the reference sign 15A in FIG. 15 occurs, the server apparatus 200 determines that the image reading device 130 of the second image forming apparatus 102 has a trouble.

In a case where a color streak occurs and this color streak occurs in the chart image data CD and the image formation surface data GD as indicated by the case B of FIG. 16, the server apparatus 200 determines that the image forming unit 100A of the first image forming apparatus 101 and the image forming unit 100A of the second image forming apparatus 102 have a trouble.

In this case, information indicating that a trouble is occurring in the image forming unit 100A of the first image forming apparatus 101 is displayed on the display screen indicated by the reference sign 11A of FIG. 11.

Furthermore, in this case, information indicating that a trouble is occurring in the image forming unit 100A of the second image forming apparatus 102 is displayed on a display screen different from the display screen indicated by the reference sign 11A or in the image 11B that is additionally displayed.

In a case where a color streak occurs and this color streak occurs in the chart image data CD and the blank surface data HD as indicated by the case C, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A or in the image 11B that is additionally displayed.

In a case where a color streak occurs and this color streak occurs only in the chart image data CD as indicated by the case D, the server apparatus 200 determines that the image forming unit 100A of the first image forming apparatus 101 has a trouble.

In this case, information indicating that a trouble is occurring in the image forming unit 100A of the first image forming apparatus 101 is displayed on the display screen indicated by the reference sign 11A in FIG. 11.

In the case D, information indicating that a trouble is occurring is included in the result of diagnosis of the first image forming apparatus 101, and information indicating that a trouble is occurring is not included in the result of diagnosis of the second image forming apparatus 102.

In this case, it is determined that the image forming unit 100A of the first image forming apparatus 101 has a trouble.

In this case, information indicating that a trouble is occurring in the image forming unit 100A of the first image forming apparatus 101 is displayed on the display screen indicated by the reference sign 11A in FIG. 11, as described above.

The streak indicated by the reference sign SJ1 in FIG. 14 is a streak that matches the condition indicated by the case D, and in a case where the streak indicated by the reference sign SJ1 in FIG. 14 occurs, the server apparatus 200 determines that the image forming unit 100A of the first image forming apparatus 101 has a trouble.

Furthermore, the streak indicated by the reference sign 15B in FIG. 15 is also a streak that matches the condition indicated by the case D, and in a case where the streak indicated by the reference sign 15B in FIG. 15 occurs, the server apparatus 200 determines that the image forming unit 100A of the first image forming apparatus 101 has a trouble.

In a case where a color streak occurs and this color streak does not occur in the chart image data CD and occurs in the image formation surface data GD and the blank surface data HD as indicated by the case E, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In the case E, information indicating that a trouble is occurring is not included in a result of diagnosis of the first image forming apparatus 101, and information indicating that a trouble is occurring is included in a result of diagnosis of the second image forming apparatus 102.

In this case, information indicating that a trouble is occurring in the second image forming apparatus 102 is displayed on a display screen different from the display screen indicated by the reference sign 11A in FIG. 11 or in the image 11B that is additionally displayed.

This is described in detail. In the case E, information indicating that a trouble is occurring is included in a result of diagnosis of the one surface (see FIG. 13A) of the paper for own apparatus PJ, which is an example of an image formation surface on which the colored image part 92 and the code image KG are formed.

Furthermore, in the case E, information indicating that a trouble is occurring is included in a result of diagnosis of the other surface (see FIG. 13B), which is an example of a blank surface opposite to the image formation surface.

Furthermore, in this case E, a position of the trouble on the one surface and a position of the trouble on the other surface match each other.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a color streak occurs and this color streak occurs only in the image formation surface data GD as indicated by the case F, the server apparatus 200 determines that the image forming unit 100A of the second image forming apparatus 102 has a trouble.

More specifically, in the case F, information indicating that a trouble is occurring is included in a result of diagnosis of the one surface, which is an example of an image formation surface, and information indicating that a trouble is occurring is not included in a result of diagnosis of the other surface, which is an example of a blank surface.

In this case, information indicating that a trouble is occurring in the image forming unit 100A of the second image forming apparatus 102 is displayed on a display screen different from the display screen indicated by the reference sign 11A in FIG. 11 or in the image 11B that is additionally displayed.

The streak indicated by the reference sign 15C in FIG. 15 is a streak that matches the condition indicated by the case F, and in a case where the streak indicated by the reference sign 15C in FIG. 15 occurs, the server apparatus 200 determines that the image forming unit 100A of the second image forming apparatus 102 has a trouble.

In this case, information indicating that a trouble is occurring in the image forming unit 100A of the second image forming apparatus 102 is displayed on a display screen different from the display screen indicated by the reference sign 11A in FIG. 11 or in the image 11B that is additionally displayed.

In a case where a color streak occurs and this color streak occurs only in the blank surface data HD as indicated by the case G, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a color streak does not occur in any of the read image data as indicated by the case H, the server apparatus 200 determines that none of the apparatuses has a trouble.

In this case, information indicating that a trouble is not occurring is displayed on the display screen indicated by the reference sign 11A in FIG. 11.

In a case where a white streak occurs and this white streak occurs in the chart image data CD, the image formation surface data GD, and the blank surface data HD as indicated by the case I, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a white streak occurs and this white streak occurs in the chart image data CD and the image formation surface data GD as indicated by the case J, the server apparatus 200 determines that the image forming unit 100A of the first image forming apparatus 101 and the image forming unit 100A of the second image forming apparatus 102 have a trouble.

In this case, information indicating that a trouble is occurring in the image forming unit 100A of the first image forming apparatus 101 is displayed on the display screen indicated by the reference sign 11A in FIG. 11. Furthermore, in this case, information indicating that a trouble is occurring in the image forming unit 100A of the second image forming apparatus 102 is displayed on a display screen different from the display screen indicated by the reference sign 11A in FIG. 11 or in the image 11B that is additionally displayed.

In a case where a white streak occurs and this white streak occurs in the chart image data CD and the blank surface data HD as indicated by the case K, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a white streak occurs and this white streak occurs only in the chart image data CD as indicated by the case L, the server apparatus 200 determines that the image forming unit 100A of the first image forming apparatus 101 has a trouble.

In this case, information indicating that a trouble is occurring in the image forming unit 100A of the first image forming apparatus 101 is displayed on the display screen indicated by the reference sign 11A in FIG. 11.

In a case where a white streak occurs and this white streak does not occur in the chart image data CD and occurs in the image formation surface data GD and the blank surface data HD as indicated by the case M, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a white streak occurs and this white streak occurs only in the image formation surface data GD as indicated by the case N, the server apparatus 200 determines that the image forming unit 100A of the second image forming apparatus 102 has a trouble.

In this case, information indicating that a trouble is occurring in the image forming unit 100A of the second image forming apparatus 102 is displayed on a display screen different from the display screen indicated by the reference sign 11A in FIG. 11 or in the image 11B that is additionally displayed.

In a case where a white streak occurs and this white streak occurs only in the blank surface data HD as indicated by the case O, the server apparatus 200 determines that the image reading device 130 of the second image forming apparatus 102 has a trouble.

In this case, information indicating that a trouble is occurring in the image reading device 130 of the second image forming apparatus 102 is displayed on a display screen different from the display screen indicated by the reference sign 11A in FIG. 11 or in the image 11B that is additionally displayed.

In a case where a white streak does not occur in any of the read image data as indicated by the case P, the server apparatus 200 determines that none of the apparatuses has a trouble.

In this case, information indicating that a trouble is not occurring is displayed on the display screen indicated by the reference sign 11A in FIG. 11.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus, comprising:
an image former configured to form an image on a recording medium and configured to form an image for diagnosis used for diagnosis of the image forming apparatus;
an image reader configured to read the image for diagnosis formed on a recording medium; and
a processor configured to
change a processing condition under which a read image obtained by the image reader by reading the image for diagnosis is processed in accordance with an elapsed period from a time of generation of the recording medium on which the image for diagnosis is formed to a time of reading of the image for diagnosis by the image reader being longer than a predetermined threshold value, and
use a reduced compression rate of the read image where the elapsed period is longer than the predetermined threshold value compared to where the elapsed period is not longer than the predetermined threshold value.

2. The image forming apparatus according to claim 1, wherein
the processor is configured to change at least one of a reading condition under which the image reader reads the image for diagnosis and the processing condition in accordance with a mode of diagnosis of the image forming apparatus.

3. The image forming apparatus according to claim 2, wherein:
the mode of diagnosis includes a first mode and a second mode in which the image forming apparatus is diagnosed by using more information than in the first mode; and
the processor is configured to change at least one of the reading condition and the processing condition in accordance with whether the mode of diagnosis is the first mode or the second mode.

4. The image forming apparatus according to claim 3, wherein:
in the second mode, the processor is configured to increase resolution at which the image reader reads the image for diagnosis and/or reduce a compression rate at which the read image is compressed compared to the first mode.

5. The image forming apparatus according to claim 3, wherein:
the processor is configured to compress the read image in the first mode and not to compress the read image in the second mode.

6. The image forming apparatus according to claim 1, wherein:
the processor is configured to compress the read image where the elapsed period is not longer than the predetermined threshold value and not to compress the read image where the elapsed period is longer than the predetermined threshold value.

7. An image forming apparatus, comprising:
an image former configured to form an image on a recording medium and configured to form an image for diagnosis used for diagnosis of the image forming apparatus;
an image reader configured to read the image for diagnosis formed on a recording medium; and
a processor configured to
change a processing condition under which a read image obtained by the image reader by reading the image for diagnosis is processed in accordance with whether the number of times of reading of the image for diagnosis by the image reader is larger than a predetermined threshold value, and
the processor is configured to use a reduced compression rate of the read image where the number of times of reading is larger than the predetermined threshold value, as compared to where the number of times of reading is not larger than the predetermined threshold value.

8. The image forming apparatus according to claim 7, wherein:
the processor is configured to compress the read image where the number of times of reading is not larger than the predetermined threshold value and not to compress the read image where the number of times of reading is larger than the predetermined threshold value.

9. An image forming apparatus, comprising:
means for forming an image on a recording medium and an image for diagnosis used for diagnosis of the image forming apparatus;
image reading means for reading the image for diagnosis formed on a recording medium;
means for changing at least one of a reading condition under which the image reading means reads the image for diagnosis and a processing condition under which a read image obtained by the reading is processed in accordance with an elapsed period from a time of generation of the recording medium on which the image for diagnosis is formed to a time of reading of the image for diagnosis by the image reading means being longer than a predetermined threshold value; and
means for using a reduced compression rate of the read image where the elapsed period is longer than the predetermined threshold value compared to where the elapsed period is not longer than the predetermined threshold value.

* * * * *